US010539655B1

(12) United States Patent
Hernandez et al.

(10) Patent No.: US 10,539,655 B1
(45) Date of Patent: Jan. 21, 2020

(54) METHOD AND APPARATUS FOR RAPID ACOUSTIC ANALYSIS

(71) Applicant: United States of America as represented by the Secretary of the Navy, Arlington, VA (US)

(72) Inventors: John Christopher Hernandez, El Paso, TX (US); Dustin Wayne Morris, Poulsbo, WA (US)

(73) Assignee: United States of America as represented by the Secretary of the Navy, Arlingtion, VA (US)

( * ) Notice: Subject to any disclaimer, the term of this patent is extended or adjusted under 35 U.S.C. 154(b) by 0 days.

(21) Appl. No.: 15/941,536

(22) Filed: Mar. 30, 2018

Related U.S. Application Data

(63) Continuation of application No. 14/833,728, filed on Aug. 24, 2015.

(60) Provisional application No. 62/043,259, filed on Aug. 28, 2014.

(51) Int. Cl.
G01S 7/00 (2006.01)

(52) U.S. Cl.
CPC .................. *G01S 7/003* (2013.01)

(58) Field of Classification Search
CPC ................................................. G01S 7/003
See application file for complete search history.

(56) References Cited

U.S. PATENT DOCUMENTS

| 4,439,765 A * | 3/1984 | Wilmot | G01S 7/2928 |
| | | | 342/203 |
| 6,507,790 B1 * | 1/2003 | Radomski | G01H 1/003 |
| | | | 702/39 |
| 6,629,076 B1 * | 9/2003 | Haken | G10L 21/06 |
| | | | 704/270 |
| 2002/0133333 A1 | 9/2002 | Ito et al. | |
| 2004/0002867 A1 * | 1/2004 | Nakagawa | G10L 15/20 |
| | | | 704/275 |
| 2010/0271905 A1 | 10/2010 | Khan et al. | |

OTHER PUBLICATIONS

Harney, Robert C., "Combat Systems," Naval Postgraduate School, 2004, <http://cnqzu.com/library/Anarchy%20Folder/Electronics%20and%20Communications/Electronic%20Warfare/Combat%20System%20Sensors.pdf>.
Martino, J. C. and S. Tabbone, "An Approach to Detect LOFAR Lines," Pattern Recognition Letter 17 (Apr. 1995), <http://www.loria.fr/~tabbone/PAPERS/prl_96.pdf >.

(Continued)

*Primary Examiner* — Hovhannes Baghdasaryan
(74) *Attorney, Agent, or Firm* — Naval Postgraduate School; Scott Bell

(57) ABSTRACT

A computer-implemented method of identifying a target includes receiving at least one data input related to the target from at least one data source. At least one acoustic parameter is calculated from the at least one data input. A target identification algorithm is applied to at least one acoustic data parameter. An identification of the target is produced from at least one acoustic parameter when the target identification algorithm is applied thereto. The identification of the target is displayed.

8 Claims, 28 Drawing Sheets (9 of 28 Drawing Sheet(s) Filed in Color)

(56) References Cited

OTHER PUBLICATIONS

Perovic, Dordevic, Takaci Paskota and Aleksandar Jovanovic, "Automatic Recognition of Features in Spectrograms Based on some Image Analysis Methods," Acta Polytechnica Hungarica 10, No. 2 (2013), <http://www.uni-obuda.hu/journal/Perovic_Dordevic_Paskota_Takaci_Jovanovic_40.pdf>.
Falkena, Wouter, "xml2struct", MATLAB File Exchange, entry posted Aug. 20, 2010, <http://www.mathworks.com/matlabcentral/fileexchange/28518-xml2struct>.
Yang, Y. H., "Relaxation Method Applied to LOFARGRAM," Master's thesis, Naval Postgraduate School, 1990, pp. 1-65.

* cited by examiner

US 10,539,655 B1

METHOD AND APPARATUS FOR RAPID ACOUSTIC ANALYSIS

CROSS REFERENCE TO RELATED PATENTS AND APPLICATIONS

This application is a continuation application of U.S. patent application Ser. No. 14/833,728, filed Aug. 24, 2015, which claims priority to and the benefit of U.S. Provisional Patent Application No. 62/043,259, filed Aug. 28, 2014, both of which are hereby incorporated in their entirety by reference and the benefits of each is hereby claimed.

BACKGROUND

Although the existing methodology of analyzing acoustic spectrograms is effective in identifying undersea targets of interest, the process is laborious, time intensive and undeniably subject to human error. Typically, calculations are performed using a calculator, a writing utensil and paper, a paper database, or memory. While these existing methods provide familiarity and flexibility for calculations, they are subject to numerous errors, such as a mistyped digit, math errors, and lapse of memory. Furthermore, analysis of a target identification procedure can involve a paper print out of an acoustic spectrogram search, a computer-rendered acoustic spectrogram search, or an iterative process. However, these processes, while providing visualization and familiarity, can be time-consuming.

BRIEF DESCRIPTION

In one embodiment of this disclosure, described is a computer-implemented method of identifying a target, which includes receiving at least one data input related to the target from at least one data source. At least one acoustic parameter is calculated from at least one data input. A target identification algorithm is applied to at least one acoustic data parameter. An identification of the target is produced from at least one acoustic parameter when the target identification algorithm is applied thereto. The identification of the target is displayed.

In another embodiment of this disclosure, described is a system for identifying a target including an acoustic parameter database configured to receive at least one data input related to the target from at least one data source. A calculation algorithm is programmed to calculate at least one acoustic parameter from at least one data input. An auto-analysis algorithm is programmed to apply a target identification algorithm to at least one acoustic data parameter, and produce an identification of the target from at least one acoustic parameter when the target identification algorithm is applied thereto. A graphical user interface is configured to display the identification of the target.

In still another embodiment of this disclosure, described is a system for identifying a target, which includes an acoustic parameter database configured to receive at least one data input related to the target from at least one data source. A calculation algorithm is programmed to calculate at least one acoustic parameter from at least one data input. An auto-analysis algorithm is programmed to: receive a video associated with the target; determine a time averaging factor for the video; filter the time averaged video with the time averaging factor; and produce an identification of the target from the filtered video. A graphical user interface is configured to display the identification of the target.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The present disclosure relates generally to identifying an undersea target of interest, for example, by acoustic analysts and operators. It is expected that most of the software developed in the context of this present disclosure is also applicable to on-station aircraft application. Although the software described herein is based on analyst input, the software has the potential for on-aircraft fielding.

Figure 1:
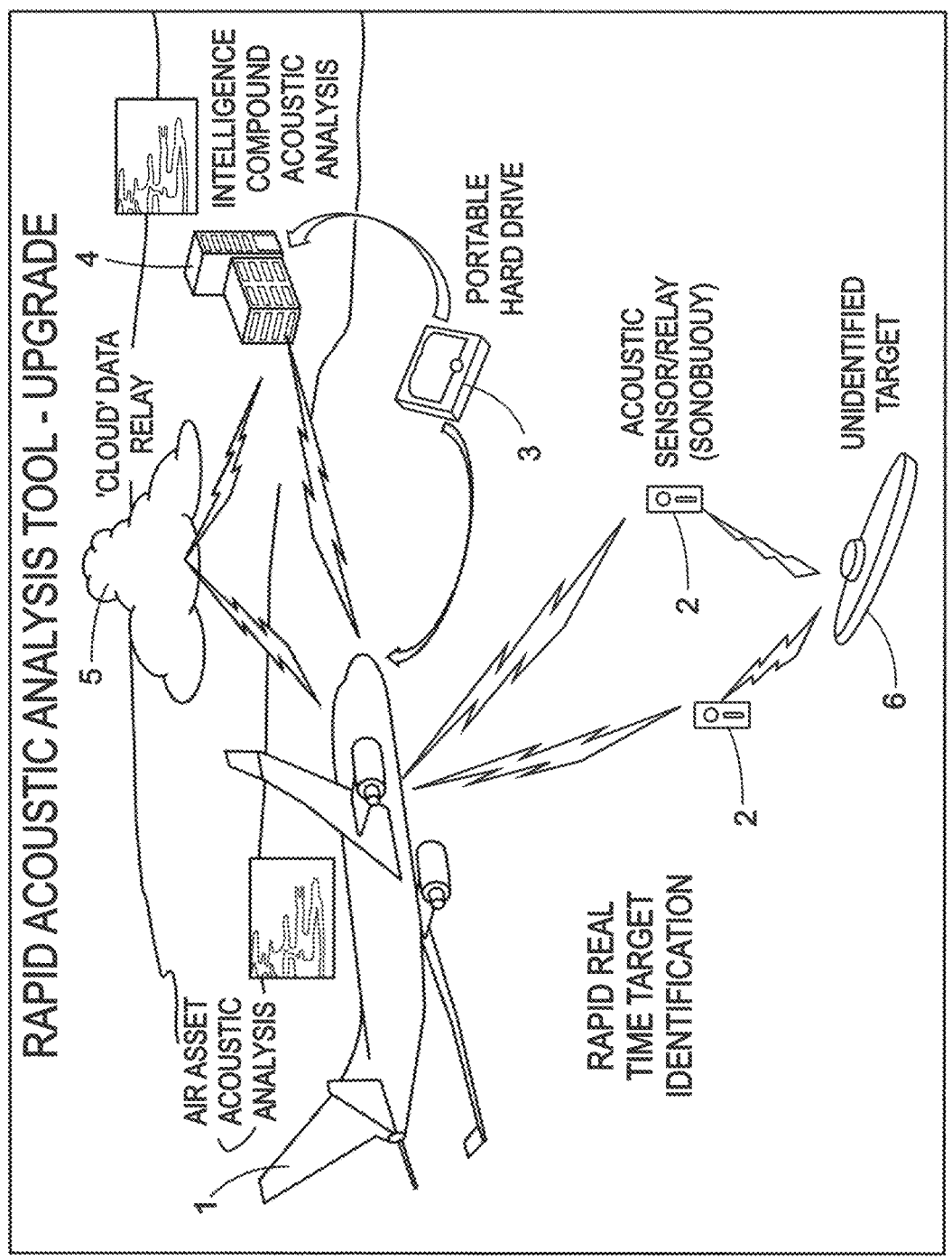
FIG. 1 shows an environment of a potential use of a system in accordance with one aspect of the present disclosure.

FIG. 1 scopes the potential fielding environments for the program. FIG. 1 shows an aircraft 1, a pair of sonobuoys 2, a hard drive 3, an intelligence compound 4, a cloud data relay 5, and an unidentified target 6. FIG. 1 displays actual (e.g., sonobuoy 2, a hard drive 3) and theoretical (e.g., cloud data relay 5) acoustic signal acquisition and signal flow. In this case, the software program can be fielded in both the aircraft 1 and intelligence compound environments 4. Aircraft application of the software can be utilized for real-time target prosecution, while the intelligence compound analysis would use the software to validate collected information prior to fleet-wide and intelligence community dissemination.

Figure 2:
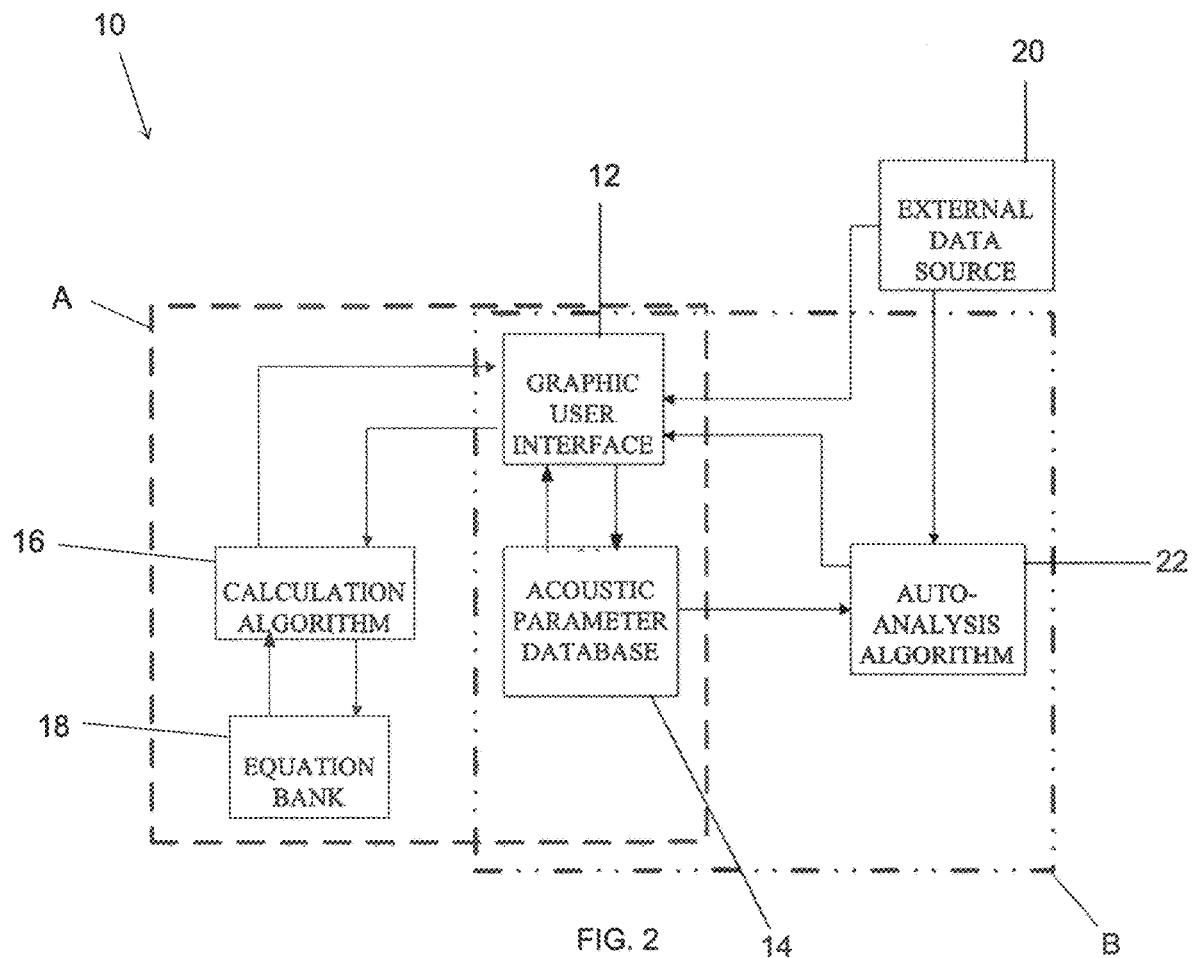
FIG. 2 is a schematic view of a RAAT-U system in accordance with one aspect of the present disclosure.

FIG. 2 shows a software centric calculation augmenting and automated target identification system, herein termed a rapid acoustic analysis tool-upgrade (RAAT-U) system 10, which increases target identification effectiveness. The RAAT-U program provides a user with automated narrow band frequency detection and ranks suspected targets of interest through the use of a computer vision centric algorithm process, as described in more detail below. Advantageously, the RAAT-U system 10 can be used to produce concise, accurate results, exponentially decreasing target identification time. To do so, the RAAT-U system 10 includes an equation solving platform to reduce the number of human errors associated with algebraic manipulation, number management and calculator error. In addition, the RAAT-U system 10 provides automated undersea target identification, providing a viable solution to freeing assets and resources that would otherwise be burdened with mundane, time consuming search missions and tasks. Automation also provides a more efficient method of rapid time target identification. For example, using the RAAT-U system 10 eliminates calculation error and reliance on memory, and improves accuracy and time for calculation. The RAAT-U system 10 can be in communication with one or more electronic databases so that: (1) information is immediately available; and (2) acoustic parameters can auto-populate the variable cells at user request. Furthermore, a computer vision algorithm-based spectrogram search can reduce the time required to scan and identify acoustic parameters of interest The RAAT-U system 10 is configured to provide a high-level component-to-component information exchange concept required to fulfill stakeholder effective needs. The information exchange concept incorporates the considerations of interfaces, software components and the outside world taken as the hardware "external data source" component depicted outside the dotted boxes A and B in FIG. 2, as described in more detail below.

The RAAT-U system 10 not only provides a means of illustrating the general software and hardware components required to meet the effective needs, but also provides a way of depicting the flow of information required within the program. Information is relayed, received, internally acted upon by a set of algorithms and produces a result that can then be sent to another software component for further processing. The information exchange continues within the program architecture until a result is displayed to the user.

Box A in FIG. 2 contains high level process components that address the acoustic parameter calculation and electronic database. A graphic user interface 12 accepts user input and displays results to the user. An acoustic parameter database 14 allows a user to both prompt and receive standardized acoustic variables therefrom. Once the known variables are present within the graphic user interface 12, this information is sent to a calculation algorithm 16. The calculation algorithm 16 draws one or more equations from an equation bank 18 to perform all necessary calculations. When the results are available, they are sent back to the graphic user interface 12 for display.

Box B in FIG. 2 contains high level process components that address stakeholder target auto-detect effective needs. An external data source 20 provides external information (e.g., acoustic spectrogram video, acoustic spectrogram images) to the RAAT-U system 10. An auto-analysis algorithm 22 contains one or more algorithms, or processes, that provides the capability for automatic target detection based on the information that is provided by the external data source 20. The auto-analysis algorithm 22 transfers and draws information from the acoustic parameter database 14 in order to perform a potential target correlation. Once results are derived, auto-analysis algorithm 22 relays the results to the graphic user interface 12 for user consumption. There are no solution specific results within the functional hierarchy contained in this section, allowing a researcher to take the existing program, find capability gaps and trace potential solutions to the functional hierarchy to satisfy future requirements.

Figure 3:
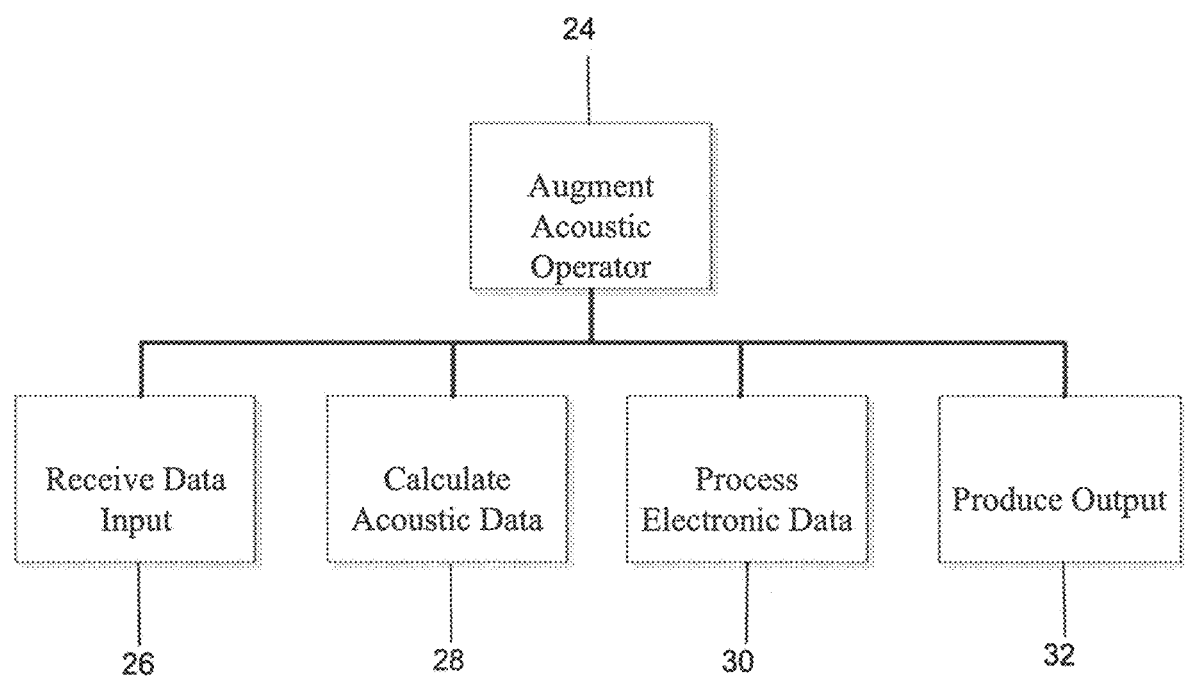
FIG. 3 shows a top level functional hierarchy of the RAAT-U system of FIG. 2.

The RAAT-U system 10 utilizes a method 24 to augment the RAAT-U system 10. The method 24 represents the overarching function of the computer program, including all top and sub-level functions depicted in FIG. 3. The method 24 includes receiving data input 26; calculating acoustic data 28; processing electronic data 30; and producing an output 32. Using these top level functions, information can be ingested into the program, processed and provide acoustic operators and analysts rapid and accurate results. At 26, one or more data inputs are received to provide a basic framework required to allow data to be entered into the program for further processing. At 28, acoustic data is calculated from the received input data to provide the user the opportunity to calculate acoustic variables and their associated harmonics. At 30, the electronic data is processed to outline the autonomous functionality of the RAAT-U system 10. At 32, an output is produced to provide the user all calculated results including both automatic target identification suggestions and calculated acoustic frequencies.

Figure 4:
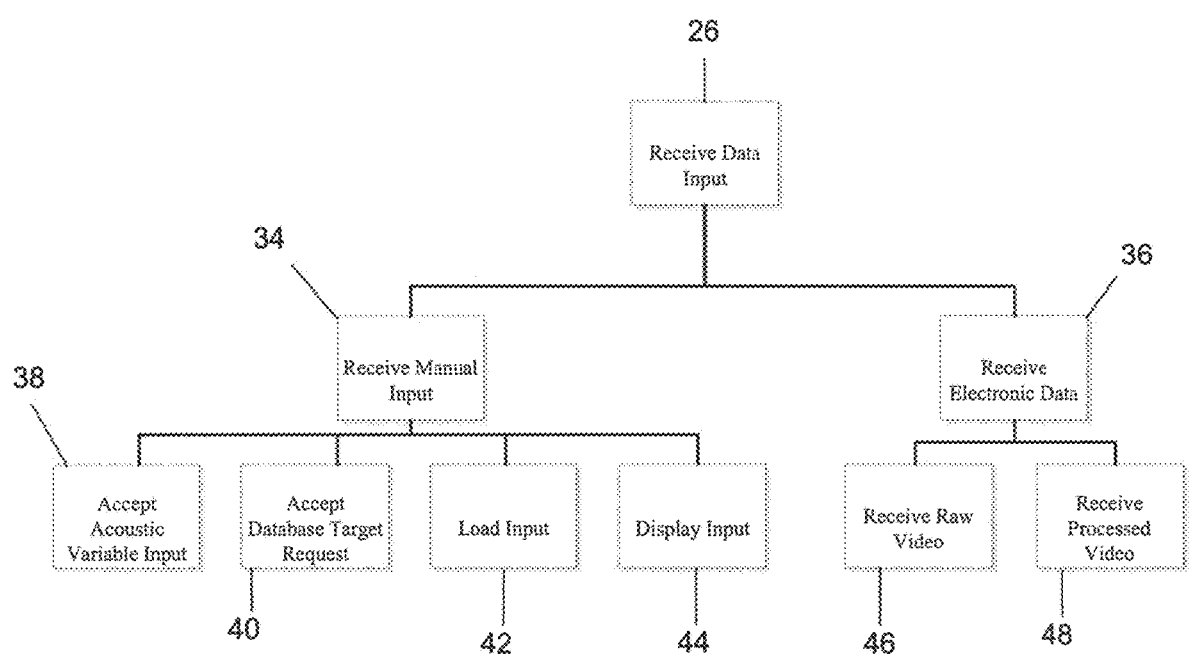
FIG. 4 shows a process of FIG. 3.

FIG. 4 shows the processes associated with receiving data input 26. Receiving data input 26 includes receiving a manual input 34 and receiving electronic data 36. Receiving a manual input 34 includes: accepting an acoustic variable input 38; accepting a database target request 40; loading an input 42; and displaying the input 44. At 38, accepting the acoustic variable input enables the user to manually enter in (using a GUI) known or suspected acoustic variables. At 40, accepting the database target request enables the user to interface with the program's built-in standardized acoustic variable database. All parameters in the electronic database are derived from credible sources and provide the user flexibility of auto-populating acoustic parameters of commonly prosecuted targets into cells for calculation. At 42, loading the input loads both the user input and auto-populated information into the program for further calculation. At 44, displaying the input provides the user a visual display of all entered and auto-populated acoustic variables.

Receiving the electronic data 36 includes receiving a raw video 46 and receiving a processed video 48. At 46, receiving the raw video enables the RAAT-U system 10 to interface with an external raw video feed for further processing. At 48, receiving the processed video enables the RAAT-U system 10 to interface with externally processed video feed for further processing.

Figure 5:
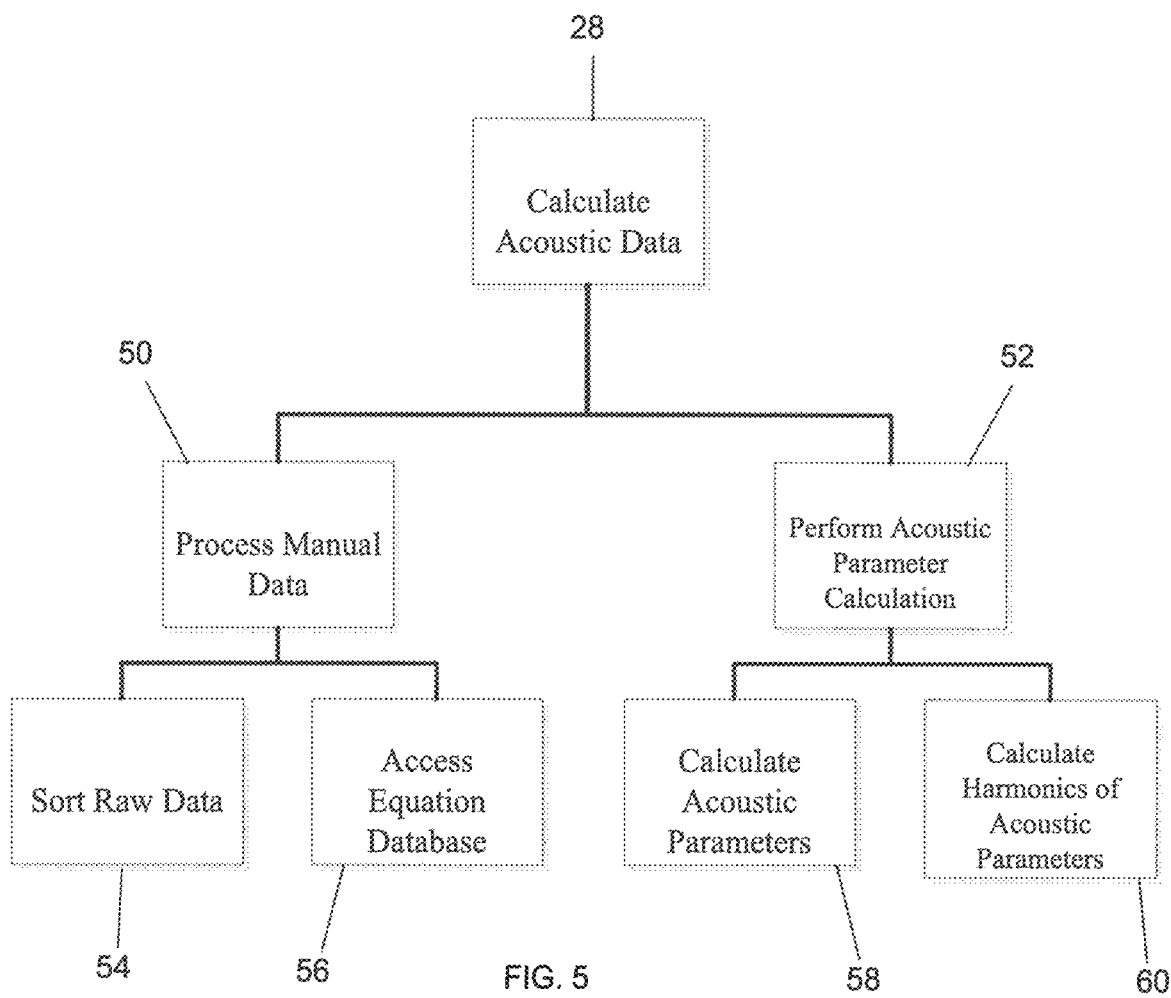
FIG. 5 shows another process of FIG. 3.

FIG. 5 shows the processes associated with calculating the acoustic data 28. Calculating the acoustic data 28 includes processing manual data 50 and performing acoustic parameter calculation 52. Processing the manual data 50 includes sorting raw data 54 and accessing the equation database 56. At 54, sorting the raw data includes taking all manual data and sorting it into appropriate data arrays for further calculation. At 56, accessing the equation database 56 includes accessing the equation bank 18 that contains all governing equations for both nuclear and diesel submarines. Performing the acoustic parameter calculation 52 includes calculating one or more acoustic parameters 58 and calculating one or more harmonics of the acoustic parameters 60. At 58, calculating the acoustic parameters 58 includes taking the sorted data array and applying the equations taken from the equation database 18. All possible algebraic solutions are provided at the end of the process given the user input. At 60, calculating the harmonics of the acoustic parameters includes taking the calculated results and providing the harmonics of only the most important parameters. The parameters considered of highest value were taken directly from stakeholder input.

Figure 6A:
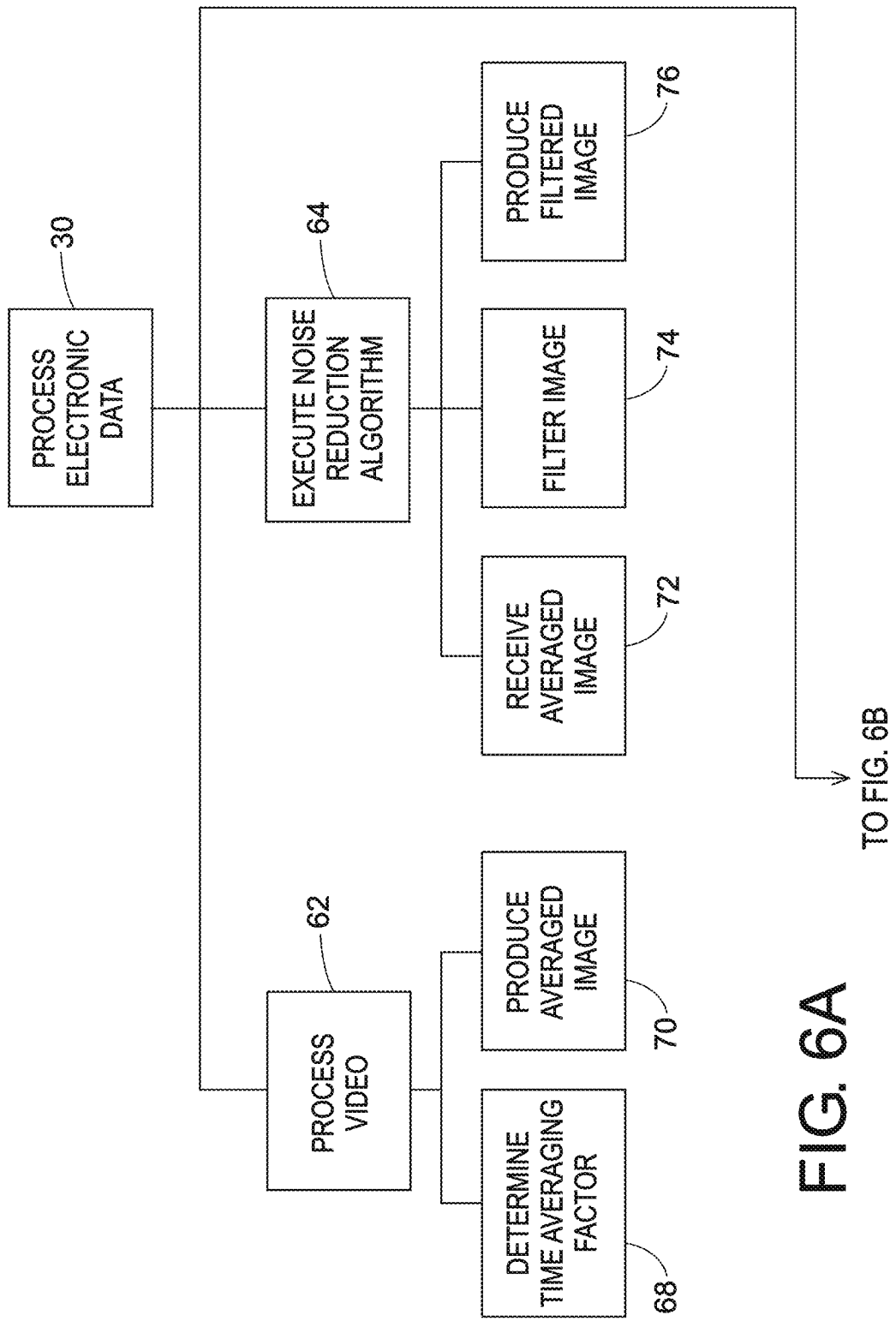
FIGS. 6A and 6B show another process of FIG. 3.
Figure 6B:
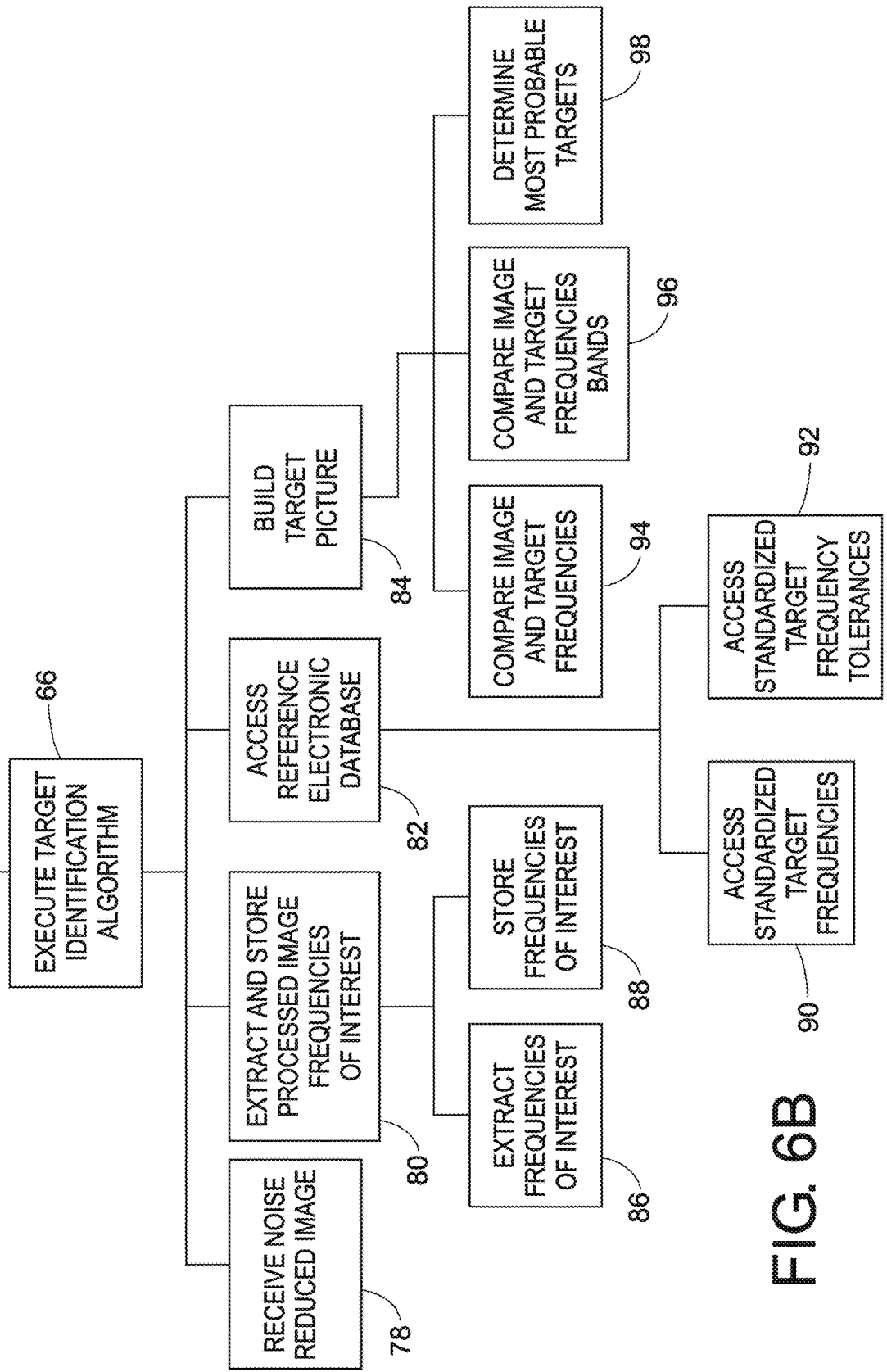

FIGS. 6A and 6B show the processes associated with processing the electronic data 30. Processing the electronic data 30 includes: processing a video 62; executing a noise reduction algorithm 64; and executing a target identification algorithm 66. Processing the video 62 includes determining a time averaging factor 68 and producing an averaged image 70. At 68, determining the time averaging factor 68 includes determining a spectrogram video feed time to be averaged to render an image for further processing. At 70, producing the averaged image 70 includes taking a time averaging factor and scaling an input spectrogram video feed to render an image with averaged pixels to produce an image for further processing, as described in more detail below.

Executing the noise reduction algorithm 64 includes: receiving the averaged image 72; filtering the averaged image 74; and producing a filtered image 76. At 72, receiving the averaged image includes receiving the time averaged spectrogram image for noise reduction. At 74, filtering the averaged image includes minimizes unwanted noise in the time averaged image, as described in more detail below. At 76, producing a filtered image includes taking the noise reduced image and preparing it for a frequency of interest extraction, as described in more detail below.

Executing the target identification algorithm 66 includes: receiving the noise reduced image 78; extracting and storing the processed image frequencies of interest 80; accessing a reference electronic database 82; and building a target picture 84. At 78, receiving the noise reduced image includes receiving the noise reduced image produced from the filtering process. At 80, extracting and storing the processed frequencies of interest includes extracting the frequencies of interest 86 and storing the frequencies of interest 88. At 86, extracting the frequencies of interest includes extracting the frequencies of interest available on the noise reduced image. At 88, storing the frequencies of interest includes taking the extracted frequencies of interest and storing them in an array in the acoustic parameter database 14 for further processing, as described in more detail below.

At 82, accessing the electronic database includes accessing standardized target frequencies 90 and accessing standardized target frequency tolerances 92. At 90, accessing the standardized target frequencies includes accessing an electronic database containing all the standardized target frequencies of interest. At 92, accessing the standardized target frequency tolerances includes accessing the electronic database containing all the standardized target frequency tolerances of interest.

At 84, building a target picture includes: comparing the image and target frequencies 94; comparing image and target frequencies bands 96; and determining one or more most probable targets 98. At 94, comparing the image and target frequencies includes comparing the processed time averaged image frequencies to each other, and comparing them to all the standardized target frequencies. At 96, comparing the image and the target frequencies bands includes comparing the processed time averaged image frequencies to each other, and comparing them to all the standardized target frequency tolerances. At 98, determining the most probable targets includes assessing the comparison of standardized target and time averaged image frequencies to make a determination of the most probable targets present. A plurality of proposed targets can then be determined, and then ranked according a "most probable" target to a "least probable" target, as described in more detail below.

Figure 7:
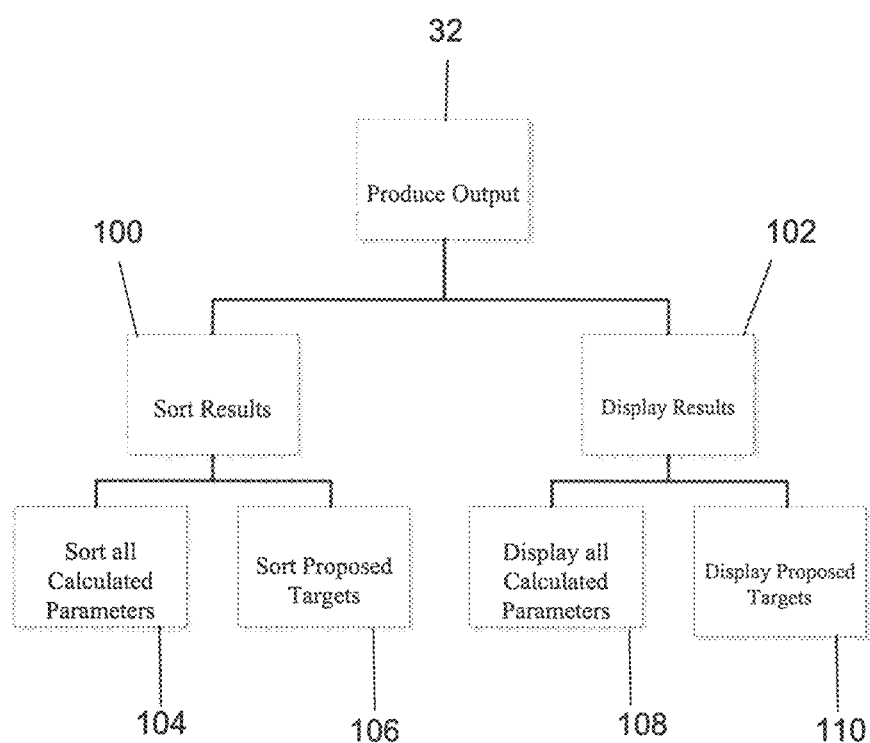
FIG. 7 shows another process of FIG. 3.

FIG. 7 shows the processes associated with producing the output 32. Producing the output 32 includes sorting one or more results 100 and display one or more results 102. Sorting the results 100 includes sorting all calculated parameters 104 and sorting one or more proposed targets 106. At 104, sorting all calculated parameters includes sorting all the calculated acoustic parameters and the associated harmonics. At 106, sorting the proposed targets includes ranking the proposed targets based on the frequency comparison algorithm according a "most probable" target to a "least probable" target. Displaying the results 102 includes displaying all calculated parameters 108 and displaying one or more of the proposed targets 110. At 108, displaying all the calculated parameters 108 includes displaying all the calculated acoustic parameters and the associated harmonics. At 110, displaying the proposed targets includes displaying all the proposed targets of interest.

Figure 8:
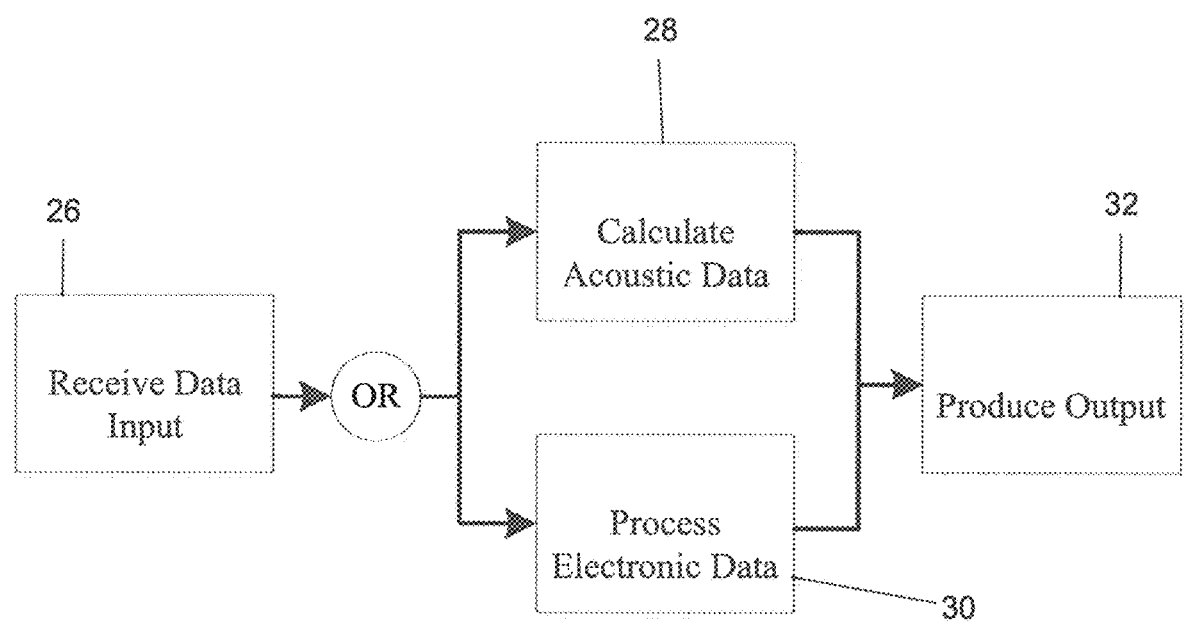
FIG. 8 shows a functional process flow for the system of FIG. 2.

FIG. 8 shows a high level functional flow for the RAAT-U system 10. The RAAT-U system 10 is launched with all functions available, but only one primary function can be utilized at a time. For example, the user has the option of using the 'calculate acoustic data' function 28 or using the 'process electronic data' function (automatic target detect) 30. The results of either option will be displayed as a final function of producing the output 32 in the process.

Figure 9:
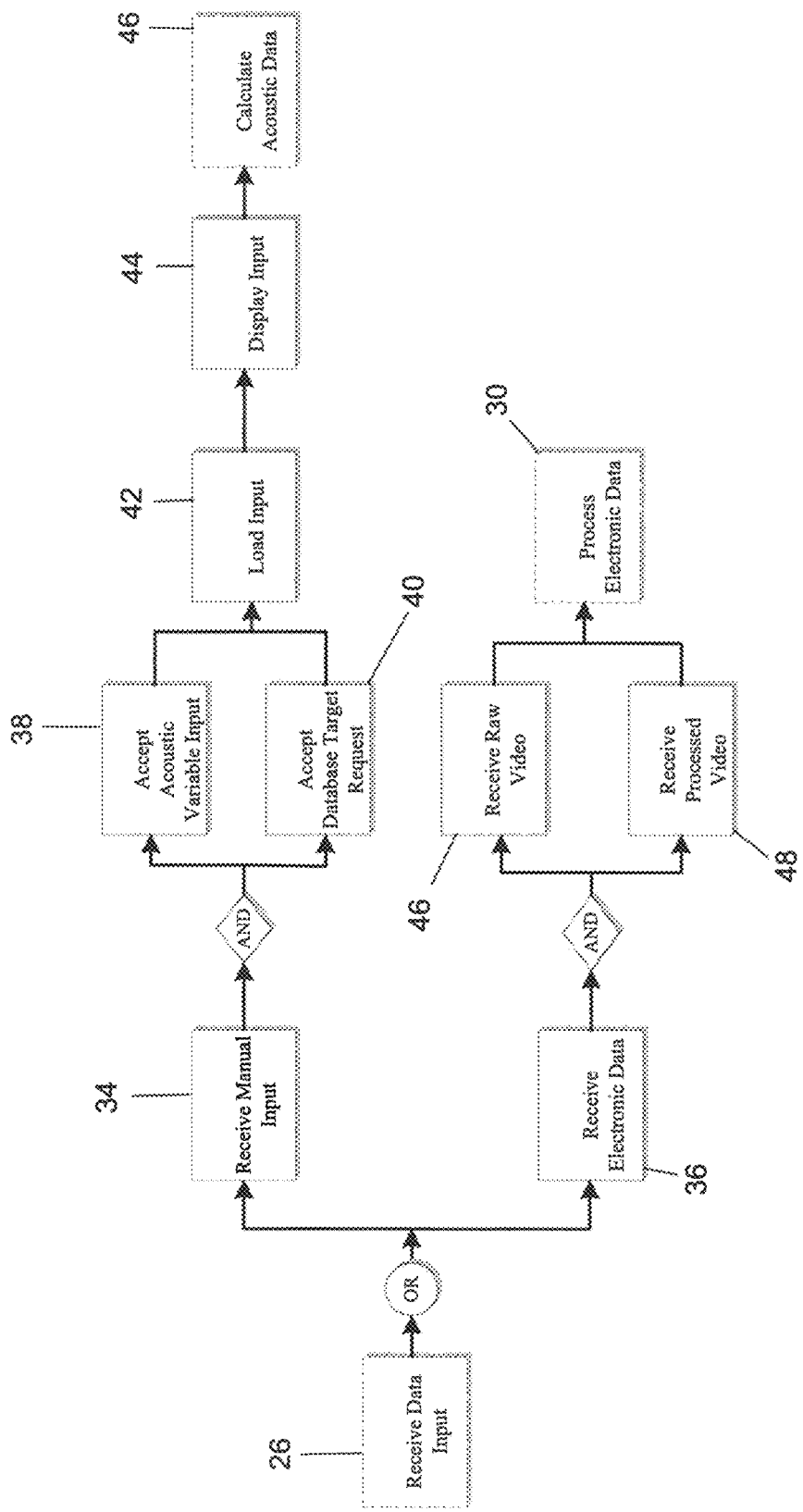
FIG. 9 is a flow chart from one process of FIG. 3 to another process.

FIG. 9 shows the processes associated with proceeding from receiving the input data algorithm 26 to either one of calculating the acoustic data algorithm 28 or processing the electronic data algorithm 30. The process begins with a user choice to either utilize the receiving manual input algorithm 34 or receiving the electronic data algorithm 36. If the user selects the receiving manual input algorithm 34, the RAAT-U system 10 allows manual selection of commonly prosecuted undersea targets, which causes the program to pre-populate known acoustic parameters from a reference database. The RAAT-U system 10 also accepts manually entered values or changes to pre-populated values by the user. This input is loaded into a data array for further processing and the input is then displayed to the user for final evaluation before calculation.

The second choice of the user has is to pursue the automatic target-detect RAAT-U capability. For example, if the user selects the receiving the electronic data algorithm 36, the user can select whether the RAAT-U system 10 receives the raw spectrogram video feed algorithm 46 or the processed spectrogram video feed algorithm 48. This video is processed further downstream with the process electronic data algorithm 30.

Figure 10:
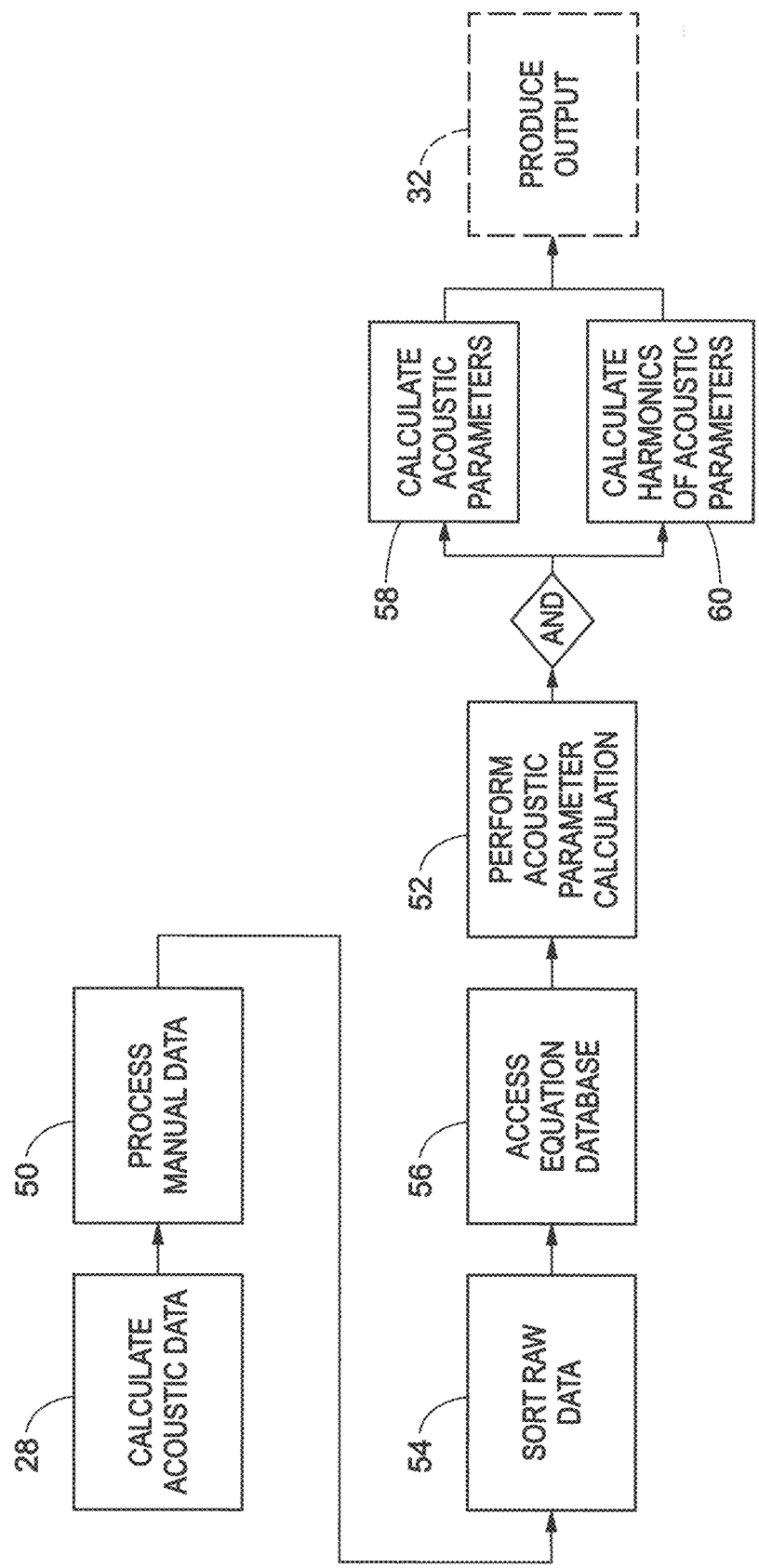
FIG. 10 is a flow chart from one process of FIG. 3 to another process.

FIG. 10 shows the processes associated with proceeding from the calculating the acoustic data algorithm 28 to the producing output algorithm 32. Once the raw data has been processed by the sorting raw data algorithm 54, the equation bank 18 is accessed. With this information, the system of linear algebraic equations is iteratively solved with the acoustic values that are initially available. The equations are again utilized to determine whether a new value(s) can be calculated after each series of calculation. This process continues until no change occurs in the data matrix containing the calculated parameters indicating no further possibilities are present ensuring the user gets the best results possible. With these base results available, the harmonics of some select acoustic variables of interest are calculated. The results are sent to the produce output algorithm 32 for output processing.

Figure 11:
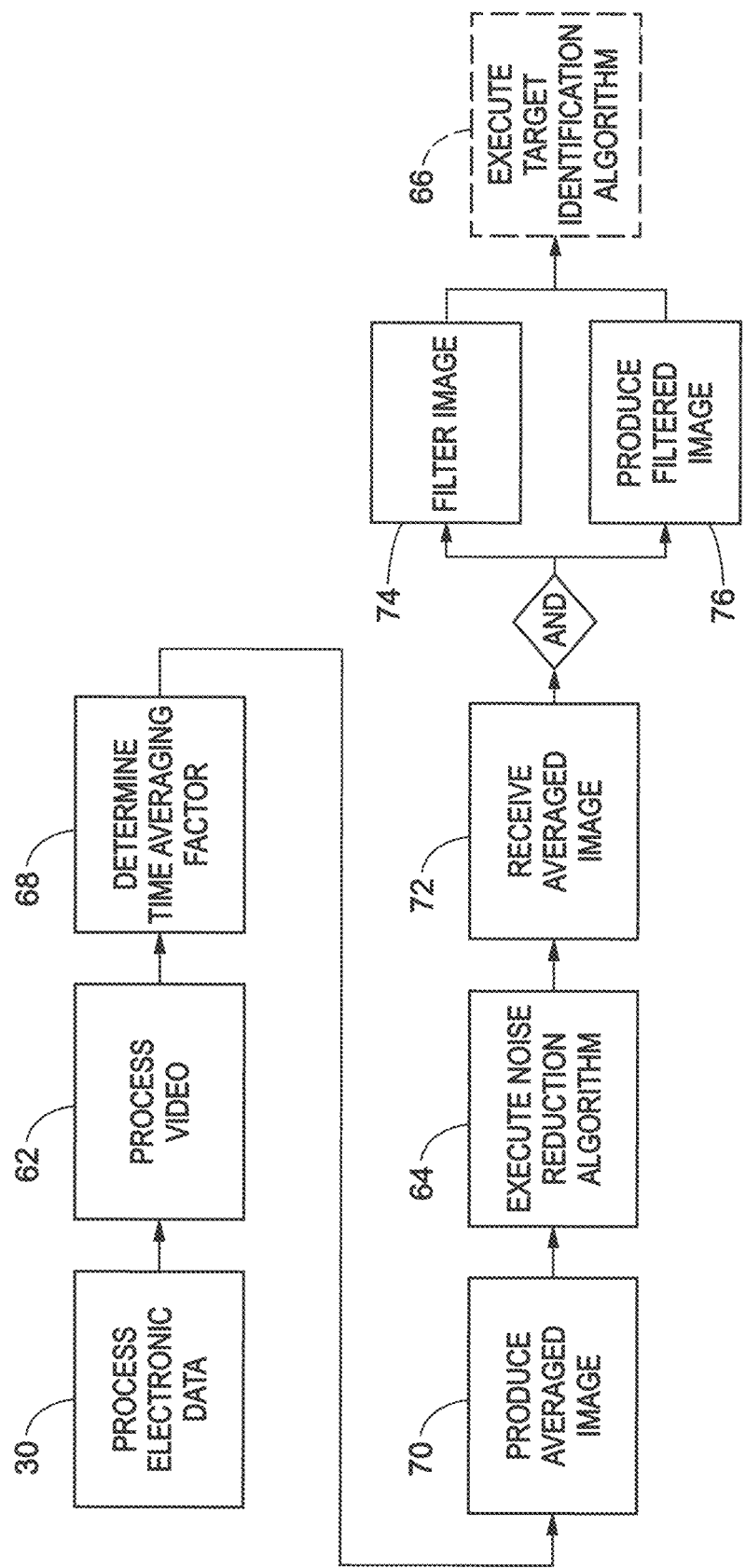
FIG. 11 is a flow chart from one process of FIG. 3 to another process.

FIG. 11 depicts a portion of the process electronic data algorithm 30. A time averaging factor is defined by the user and used to determine how often the streaming video is to be segmented for averaging and further analysis. Once the time averaging factor has been determined, the video is fed into the program, segmented, and pixel averaged to produce a time-averaged spectrogram image. Once the time averaged image is ready for evaluation, it is further processed to ensure minimal noise is present. A noise reduction algorithm is executed and the result is an image with only viable frequencies of interest for further assessment. This result is sent to the execute target identification algorithm 66.

Figure 12:
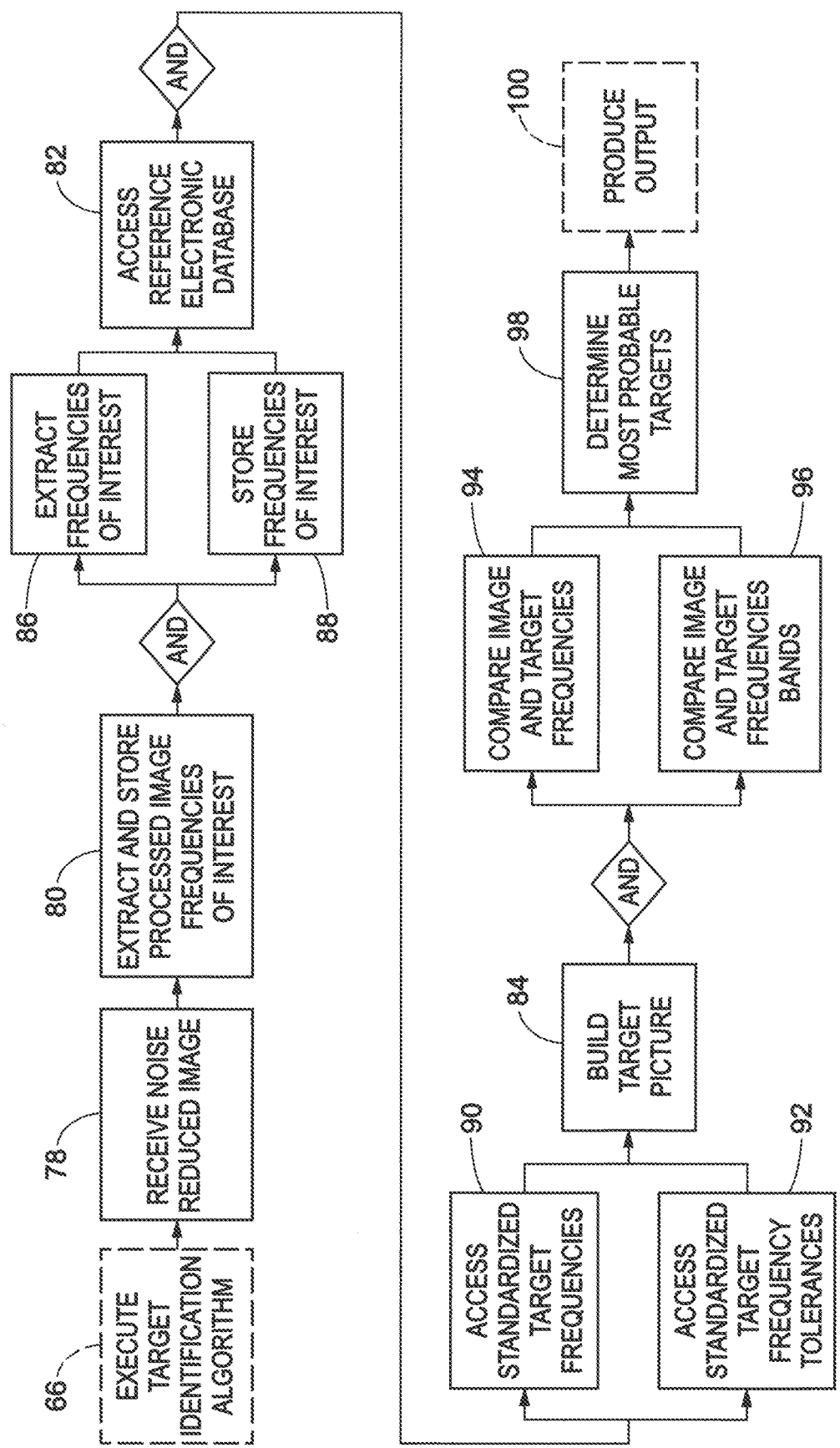
FIG. 12 is a flow chart from one process of FIG. 3 to another process.

FIG. 12 shows another portion of the process electronic data algorithm 30 and the execute target identification algorithm 66 of the RAAT-U system 10. Once the noise reduced image is received by the receive noise reduced image algorithm 78, frequencies are identified and associated information extracted (at 86) and stored (at 88) for further processing. Subsequently, the program accesses the electronic database and recalls standardized reference target frequencies (at 90) for comparison. With both the raw target frequencies and electronic frequencies available, the frequency information can now be compared (at 94) in an attempt to build a proposed target presence. This information is then sent to the produce output algorithm 32.

Figure 13:
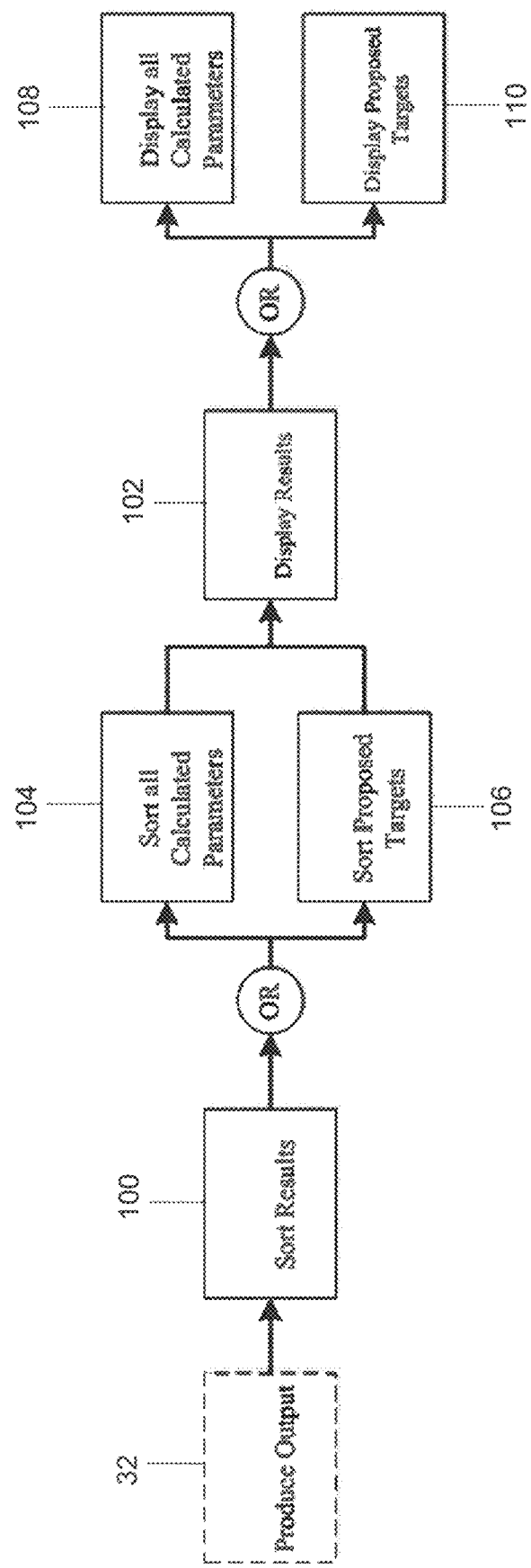
FIG. 13 is a flow chart from one process of FIG. 3 to another process.

FIG. 13 shows the processes associated with the produce output algorithm 32. Once the results of either the calculation or auto-detect algorithms are available, the results are displayed (at 110) to the user for further intelligence fusion and decision making.

FIGS. 14-29 further illustrate an implementation of the process electronic data algorithm 30.

An important capability of an acoustic operator 14 or auto-analyst algorithm 22 is to have the keen ability to recognize and correctly identify a frequency of interest on an acoustic spectrogram. The geometry of these frequencies of interest can vary to a large extent depending on Doppler shift and the frequency scale being evaluated. In this disclosure, only narrow band, vertical geometries were considered and evaluated. In addition, frequency variation is accounted for using accepted frequency tolerance values.

Figure 14:
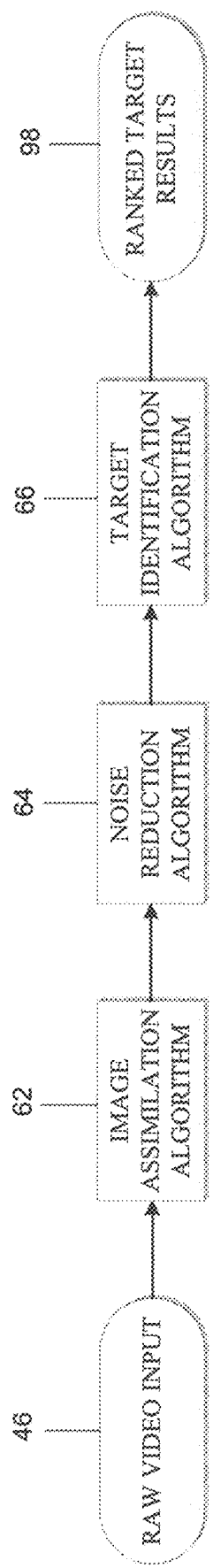
FIG. 14 is a flow chart showing a filtering process of the system of FIG. 2.

FIG. 14 shows an embodiment of the RAAT-U computer vision algorithm. A raw acoustic spectrogram was generated and fed into the RAAT-U program. The program, by means of the image assimilation algorithm 62 time-averages the pixel values on a raw video feed (provided by the receiving raw video algorithm 46) for a user defined period of time. Generally, the time averaging depends on the application of the program and can realistically range from one minute to eight minutes in acoustic data collection duration.

The time averaged image is then fed into the noise reduction algorithm 64 for image processing. In order to extract useful information, the environmental and ambient noise must be reduced to ensure the best information is fed into the final algorithm. With the noise reduced, time averaged image, the target identification algorithm 66 now cross references the results with a series of accepted target frequencies in attempt to identify the most probable target.

The RAAT-U system 10 recommends targets based on matching an existing database of reference target frequencies to a time averaged image acquired through existing acoustic equipment. With this information, it is left to the analyst or operator to fuse this real-time, concise target recommendation with all other sources of intelligence to determine target presence and identification.

In one example, a vertical axis on an acoustic spectrogram depicts a time scale. An image that shows, as example, eight minutes of data in 480 pixels has a time resolution of 1 pixel/sec. The vertical resolution parameter is important to consider. If the time period considered is too long, target acoustic emissions may appear as a short vertical line but will be lost during the image processing noise reduction phase of the algorithm. If the time period is too short, noise may appear as a target to the image processing software, resulting in false alarms.

Several short time periods may be averaged over a longer period of time and displayed as a time averaged image within the same pixel dimensions. Consider an image with a vertical size of 480 pixels and a resolution of ½ sec per pixel. This resolution would provide four minutes of data. Displaying 12 minutes of data is accomplished by time-averaging three frames of pixel values from four minute frames.

There are two possibilities for rendering the image: 1) Fixed image dimensions with variable bin-width; or 2) Fixed bin-width with variable image dimensions. For this algorithm, fixed bin-width with variable image dimensions is the most desirable approach. For a fixed dimension image, a wide frequency spectrum will result in signals of interest lost due to the wider frequency bin sizes.

Regardless of how a LOFARGRAM generation software is implemented (e.g., Excel®, MATLAB®, and the like), the subsequent stages of the RAAT-U algorithm requires raw LOFARGRAM image information (image size, frequency range, and time range). The algorithm will then standardize the image to a 256 grayscale image and calculate the time and frequency resolution of each bin before the noise reduction and signal enhancement processes. After this single image is processed and compared to reference images, another image is grabbed and the process repeats.

In another example, the noise reduction algorithm 64 involve a systematic elimination of ambient noise sources in attempt to extract the information of interest. Following a noise filtration process, the remaining spectral emissions will provide information that can be used to compare against known spectral geometries and frequencies belonging to targets of interest.

Figure 15:
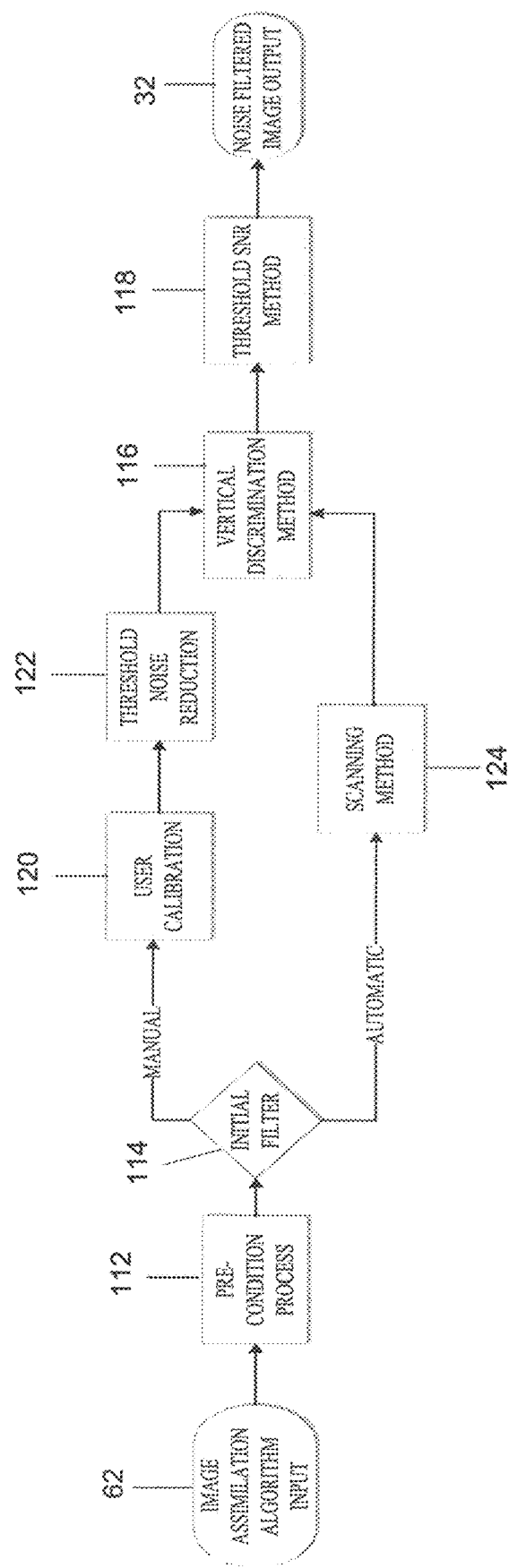
FIG. 15 is a flow chart showing the processes of FIG. 14.

As shown in FIG. 15, the noise reduction algorithm 64 includes a pre-conditioning process algorithm 112, a secondary filter algorithm 114, a vertical discrimination method algorithm 116, and a threshold signal to noise (SNR) method algorithm 118. The secondary filter algorithm 114 can include a manual user calibration algorithm 120 and a threshold noise reduction algorithm 122, and a scanning method algorithm 124.

Prior to entering the visual representation of the noise reduction algorithm 64, it is assumed that the image has been acquired by the software and pre-processed for the noise reduction algorithm application (i.e. by the image assimilation algorithm 62). The pre-processing described in the previous section involves no noise reduction filtering. This process explicitly involves generating a time averaged image from raw video feed.

Figure 16:
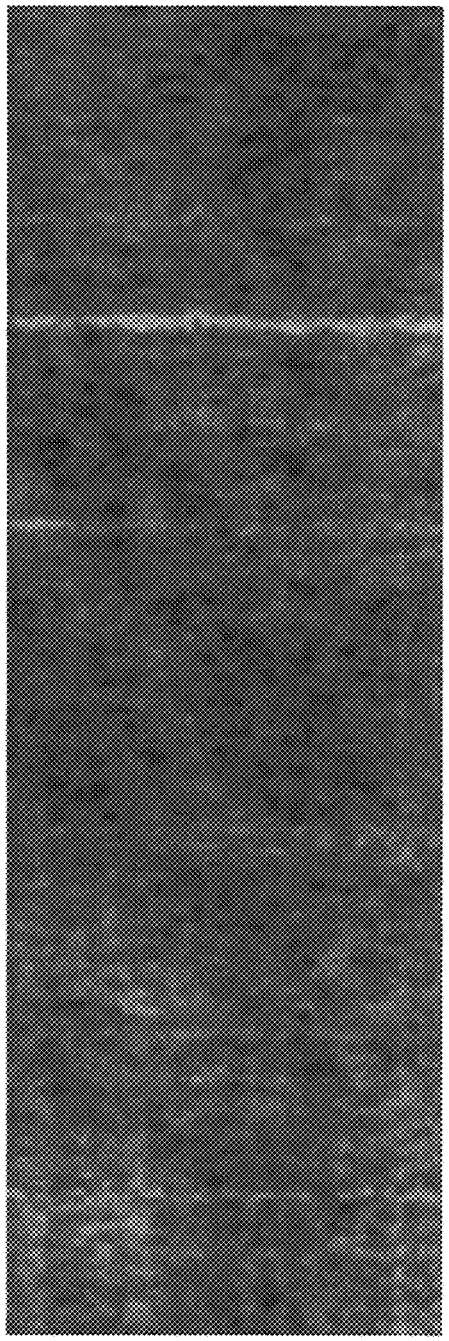
FIG. 16 is a gray scale version of a pre-processed data set of the system of FIG. 2.
Figure 17:
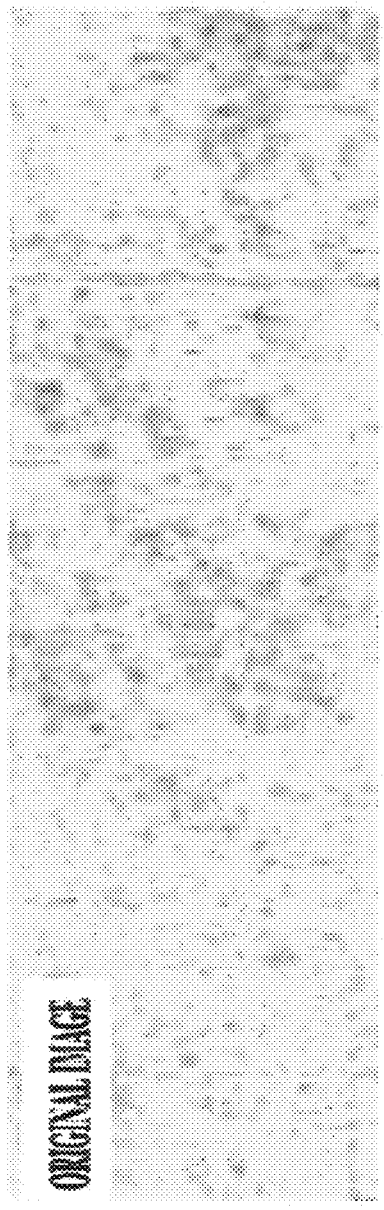
FIG. 17 is a color version of FIG. 16.

FIG. 16 is a sample, unclassified, pre-processed LOFARGRAM 256 grayscale image used to illustrate the algorithm methods described in this section. FIG. 17 is a sample pre-processed LOFARGRAM 256 grayscale image imported into Excel® in its numerical matrix form. The pixel values in this case have been assigned colors depending on pixel value. Green colors represent high frequency intensity values while red numbers represent low values.

It is important to note that each algorithm process proof-of-concept was initially developed using Excel®. MATLAB® code was generated for the final algorithm process for actual program evaluation on sample LOFARGRAM 256 grayscale images. To ensure clarification, there were two independent methods (Excel® and MATLAB®) of image noise reduction algorithm testing. The grayscale and Excel® depicted images represent two separate algorithm process illustrations. The images were independently subjected to the noise filtration process. They both start with the "Pre-Condition" filter and were then passed on to the "Secondary Filter." This portion of the process determines the noise stripping threshold value using either an automatic value determination or manually defined value. This option is chosen by the user through a program graphic user interface (GUI). Once the noise stripping threshold has been determined, the algorithm continues in its noise reduction process through the "Vertical Discrimination Method", and finally the "Threshold SNR Method". This process produces a noise filtered image with useable spectral characteristics that can now be used for further analysis. Each step in the algorithm is described in detail below.

The pre-condition process algorithm 112 is a convolution matrix used to smooth the image and draw out the high intensity features. The results are highly dependent on the N×N convolution matrix. To express the feature in mathematical terms, the output image, after convolving, can be represented as (Harney 2004, 434):

$$I_{out}(i,j) = \sum_{k=-(N-1)/2}^{k=+(N-1)/2} \sum_{l=-(N-1)/2}^{l=+(N-1)/2} I_{in}(i+k, j+l) * M_N(k,l)$$

The processed image, $I_{out}$ is convolved with the use of a 3×3 matrix for this algorithm.

The software algorithm processed image can be mathematically described as:

$$I_{out}(i,j) = \sum_{k=-(3-1)/2}^{k=+(3-1)/2} \sum_{l=-(3-1)/2}^{l=+(3-1)/2} I_{in}(i+k, j+l) * M_3(k,l)$$

where i and j represent the original image pixel, k and l the convolution matrix pixel value, $M_3$ the 3×3 convolution matrix and N the convolution matrix dimensionality.

It was determined through trial and error that application of the convolution matrix was not beneficial in the final filter process for this algorithm sequence. It was, however, provided in the final version of the algorithm sequence as an option for follow-on researchers. To mathematically negate the application of the 3×3 convolution matrix, the following matrix was used:

$$\begin{pmatrix} 0 & 0 & 0 \\ 0 & 1 & 0 \\ 0 & 0 & 0 \end{pmatrix}.$$

Using this matrix for an image of any size will result in no convolution.

The initial filter algorithm 114 provides the user the option of manually (at 120 and 122) or automatically (at 124) determining the initial pixel stripping threshold value. In order for a signal to be detected, the signal strength must be greater than the noise level surrounding the spectral line(s) of interest. The noise level can be approximated by finding the average pixel value of the entire image. However, due to interference from acoustic phenomenon such as acoustic bath tub effect and non-linear sensor noise at lower frequencies, averaging the entire image would result in a higher cutoff threshold, thereby retaining more unwanted noise.

The threshold value represents the pixel cutoff value that the program uses to either eliminate or preserve the respective pixel. For example, a pixel threshold value of 86 is determined. When the algorithm 114 evaluates each pixel in the image, any value below 86 will be eliminated or assigned a value of 0. Any pixel value equal to or above 86 will be preserved for further image refinement. From here, the image is passed onto the next phase of noise reduction.

Should the user elect to utilize the automatic threshold determination feature, the scanning method algorithm 124 is employed. This method utilizes a moving average to set the pixel stripping threshold value. Consider an artificial image of size 10×10 in Table 1. Higher pixel values in the matrix represent higher frequency intensity values. Conversely, the lower values represent lower frequency intensity values.

TABLE 1

Scanning Method Artificial Image

| Column 1 | Column 2 | Column 3 | Column 4 | Column 5 |
|---|---|---|---|---|
| 100 | 88 | 98 | 120 | 89 |
| 99 | 88 | 101 | 119 | 90 |
| 101 | 87 | 105 | 115 | 87 |
| 115 | 98 | 103 | 118 | 65 |
| 89 | 65 | 117 | 110 | 99 |
| 78 | 99 | 114 | 113 | 100 |
| 90 | 101 | 111 | 116 | 101 |
| 92 | 102 | 98 | 119 | 120 |
| 100 | 107 | 97 | 121 | 125 |
| 105 | 160 | 100 | 109 | 109 |

| Column 6 | Column 7 | Column 8 | Column 9 | Column 10 |
|---|---|---|---|---|
| 78 | 89 | 76 | 89 | 100 |
| 80 | 90 | 78 | 90 | 99 |
| 90 | 92 | 90 | 91 | 89 |
| 91 | 96 | 89 | 93 | 95 |
| 92 | 97 | 75 | 89 | 97 |
| 93 | 98 | 99 | 90 | 99 |
| 96 | 99 | 100 | 105 | 100 |
| 98 | 100 | 120 | 106 | 101 |
| 100 | 95 | 111 | 105 | 104 |
| 101 | 96 | 100 | 104 | 97 |

This scanning method algorithm 124 begins by finding the average pixel value of the first five columns of data. Subsequently, the average of the next five columns of data is calculated. This process is repeated until the entire image is "scanned." The columns outside the range of the image (column 11, 12,) are not factored into the average. In this example, the moving average of five columns is shown in Table 2.

TABLE 2

Scanning Method Moving Average Results

| | |
|---|---|
| Pixel Value Average of Columns 1-5 | 103 |
| Pixel Value Average of Columns 2-6 | 102 |
| Pixel Value Average of Columns 3-7 | 101 |
| Pixel Value Average of Columns 4-8 | 99 |
| Pixel Value Average of Columns 5-9 | 95 |

The original image pixel values are then compared to the five column moving averages. Each moving average value determined in Table 2 is compared to every pixel value in the entire image. As one can infer, each pixel value is evaluated, for this example, five times. A separate matrix in the program records the number of times each individual pixel remains above the respective moving average value for the five times it is evaluated. In this example, Table 3 shows the matrix that records the number of times each individual pixel value remained above the moving average.

TABLE 3

Scanning Method Pixel Evaluation

| Column 1 | Column 2 | Column 3 | Column 4 | Column 5 |
|---|---|---|---|---|
| 2 | 0 | 1 | 5 | 0 |
| 1 | 0 | 2 | 5 | 0 |
| 2 | 0 | 5 | 5 | 0 |
| 5 | 1 | 4 | 5 | 0 |
| 0 | 0 | 5 | 5 | 1 |
| 0 | 1 | 5 | 5 | 2 |
| 0 | 2 | 5 | 5 | 2 |
| 0 | 3 | 1 | 5 | 5 |
| 2 | 5 | 1 | 5 | 5 |
| 5 | 5 | 2 | 5 | 5 |

| Column 6 | Column 7 | Column 8 | Column 9 | Column 10 |
|---|---|---|---|---|
| 0 | 0 | 0 | 0 | 2 |
| 0 | 0 | 0 | 0 | 1 |
| 0 | 0 | 0 | 0 | 0 |
| 0 | 1 | 0 | 0 | 0 |
| 0 | 1 | 0 | 0 | 1 |
| 0 | 1 | 1 | 0 | 1 |
| 1 | 1 | 2 | 5 | 2 |
| 1 | 2 | 5 | 5 | 2 |
| 2 | 0 | 5 | 5 | 5 |
| 2 | 1 | 2 | 5 | 1 |

The final step in this process is the elimination of pixels in the original image that did not remain above all five moving average values. Pixel values that remained above all five moving average values (values of 5 in Table 3) are preserved for further processing. The pixels that did not meet the criteria are assigned a value of zero and are no longer of interest to the algorithm. Table 4 shows the results of this initial pixel stripping process.

TABLE 4

Scanning Method Matrix Results

| Column 1 | Column 2 | Column 3 | Column 4 | Column 5 |
|---|---|---|---|---|
| 0 | 0 | 0 | 120 | 0 |
| 0 | 0 | 0 | 119 | 0 |
| 0 | 0 | 105 | 115 | 0 |
| 115 | 0 | 0 | 118 | 0 |
| 0 | 0 | 117 | 110 | 0 |
| 0 | 0 | 114 | 113 | 0 |
| 0 | 0 | 111 | 116 | 0 |
| 0 | 0 | 0 | 119 | 120 |
| 0 | 107 | 0 | 121 | 125 |
| 105 | 160 | 0 | 109 | 109 |

| Column 6 | Column 7 | Column 8 | Column 9 | Column 10 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 105 | 0 |
| 0 | 0 | 120 | 106 | 0 |
| 0 | 0 | 111 | 105 | 104 |
| 0 | 0 | 0 | 104 | 0 |

The values retained are representative of high frequency intensity signatures of potential and do not represent a potential target noise signature yet. This step in the algorithm is simply a means of noise elimination. Further steps in the process address possible target recognition. Table 4 shows how column four displays the highest concentration of high frequency intensity with some seemingly random concentrations in columns 1, 2, 3, 5, 8, 9, and 10.

Figure 18:
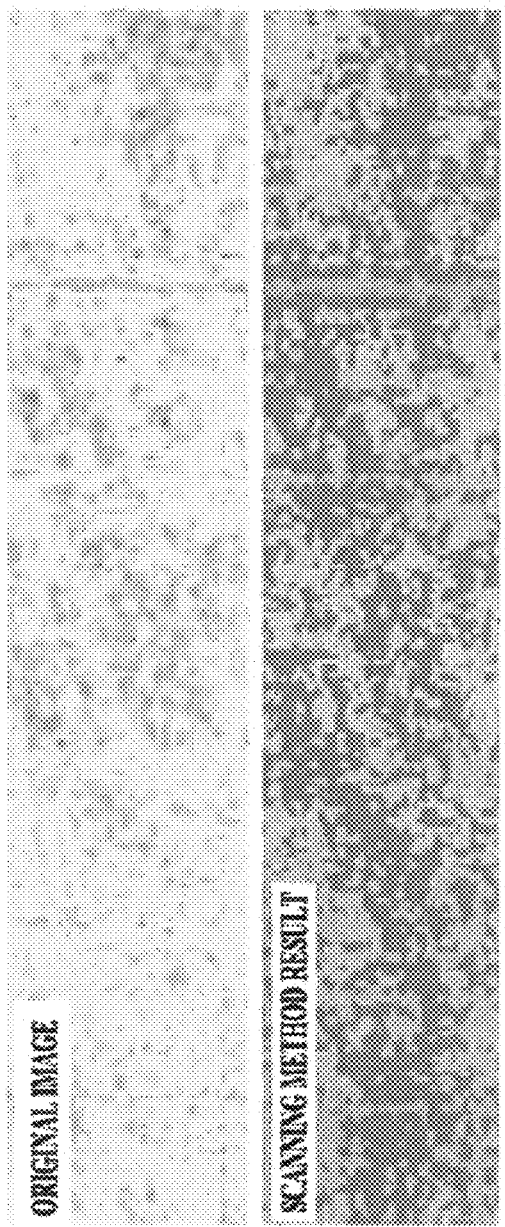
FIG. 18 is a color version of a scanned data set of FIGS. 16 and 17.
Figure 19:
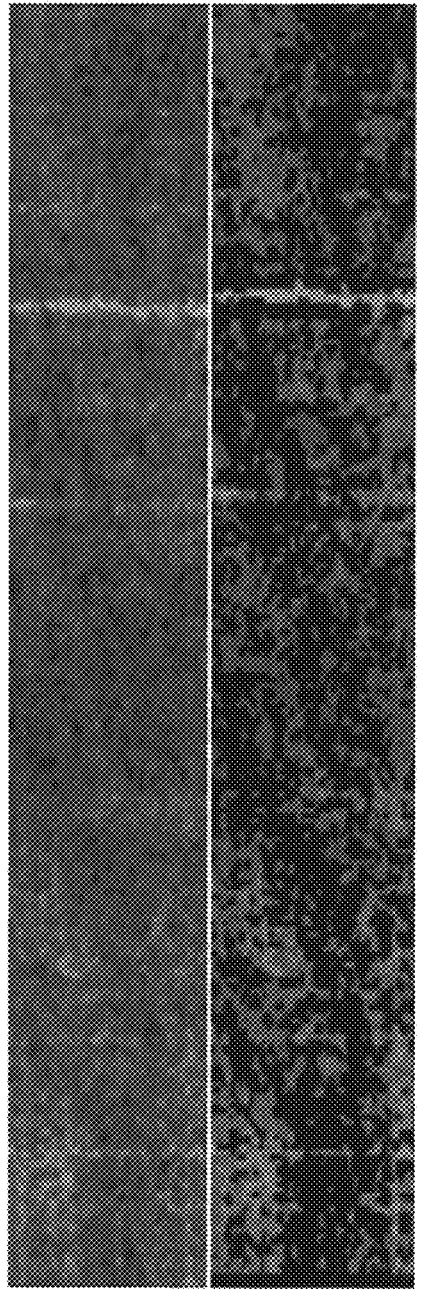
FIG. 19 is a gray scale version of FIG. 18.

FIG. 18 shows the results of this process applied during the proof-of-concept Excel® images. The bottom image represents the image with all values below the threshold value displayed as red pixels (or zero value). All pixels above the threshold value were preserved. FIG. 19 depicts the MATLAB® scanning method results.

Images that are noise saturated on one end of the frequency spectrum and relatively clean on the other will gain the most benefit from this technique. Should the image be relatively homogeneous in frequency intensity across the spectrum, benefit from this approach will be minimal and may result in some loss of information.

Another potential disadvantage to this method is the pixel-by-pixel evaluation. Although the method produces fair results, independent of other techniques, the process may result in increased processing time with larger images or slow processors. Since each pixel is evaluated five times over, the process is thorough, but potentially time consuming.

The vertical discrimination method algorithm 116 compares horizontal, or column, neighboring pixel values in an attempt to recognize vertical geometry lines. If these pixel values possess similar frequency intensity values, it is not a far leap to assume that the two pixels are possibly related. The validity of this assumption was tested during algorithm design and stochastic modeling after prototype development.

The problem with this assumption presents itself in noise saturated environments where an undesired acoustic emission can potentially match the value of a frequency of interest. With noise in close proximity to a desired spectral emission line, there exists the possibility for the algorithm to incorrectly identify the noise emission as part of the desired frequency band. This obstacle of spectrogram noise saturation is addressed and accounted for in subsequent portions of the algorithm.

When the algorithm process reaches the "vertical method," the image will have already been pre-filtered by previous steps. This process was developed by subjecting it to a raw, unprocessed sample Excel® based image seen in FIG. 20.

Figure 21:
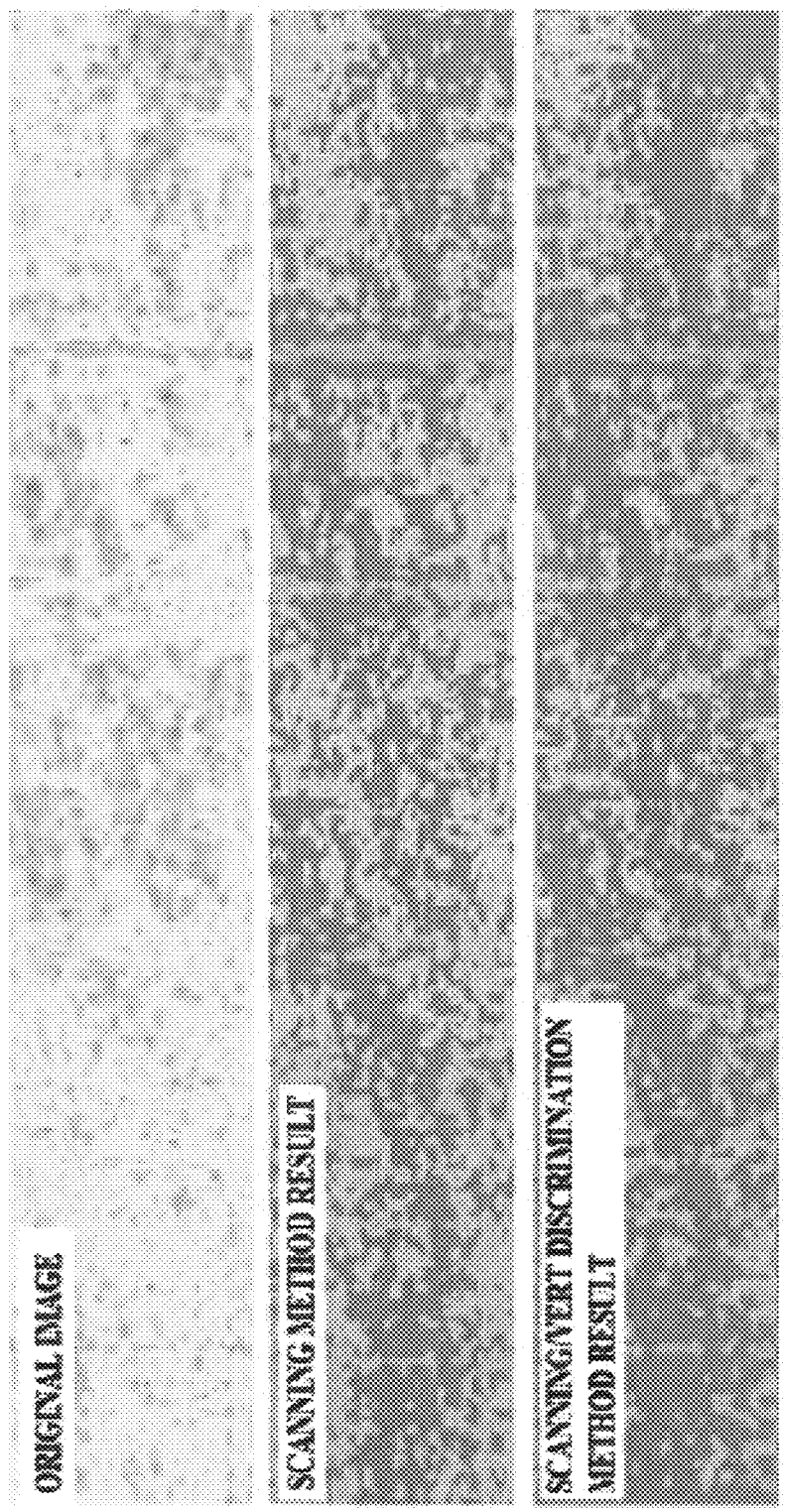
FIG. 21 is another filtered data set of the system of FIG. 2.

In FIG. 21, the lines of interest (LOI) are easily discernible by the contrast between the darker background noise (red/yellow segments) and the higher frequency intensity line (green segments). Background noise, at times, can peak in pixel value above the signal of interest pixel values. Given this problem, one can see that explicit use of the "initial filter" described in previous sections would not be sufficient in removing all the unwanted noise.

The "vertical discrimination method" utilizes the fact that at lower image resolutions, the signal frequency variation remains within one or two columns of pixel data. The algorithm accounts for this frequency drift with the use of accepted frequency tolerances.

Figure 20:
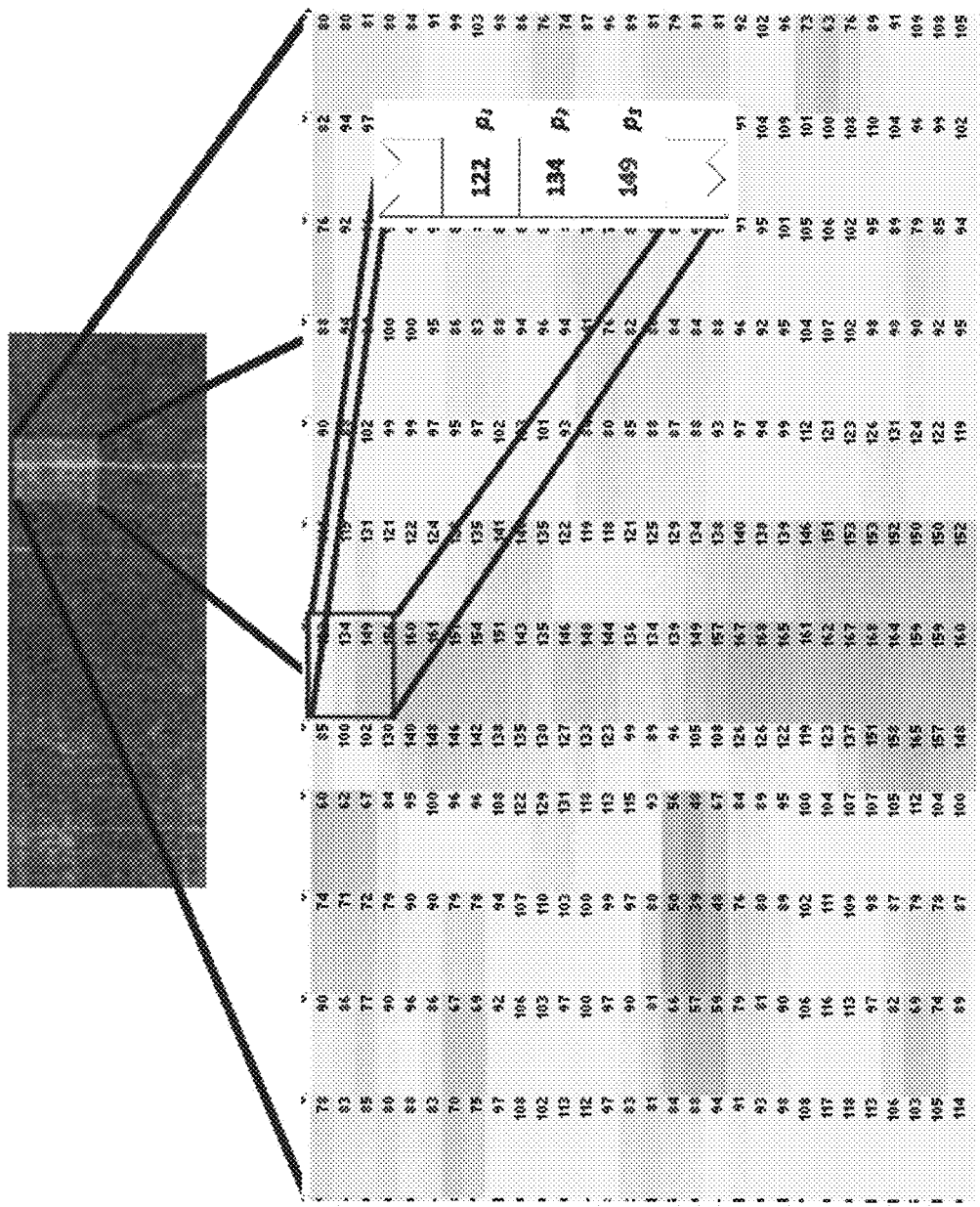
FIG. 20 is another filtered data set of the system of FIG. 2.

In FIG. 20, the initial pixel (1,1), or $p_1$, is compared in value with the next pixel in the column (1,2), or $p_2$. If $(p_1+\text{sensitivity})>p_2>(p_1-\text{sensitivity})$, then pixel $p_1$ is assigned to reference matrix (say, "matrix A") with the same size as the original image matrix. If $(p_1+\text{sensitivity})<p_2<(p_1-\text{sensitivity})$, a value of zero is assigned to the reference pixel $p_1$ in matrix A. This process continues by comparing $p_2$ with $p_3$ in a similar fashion until all pixels are compared to their nearest vertical neighbor. Matrix A is thus constructed with these operations until the entire image is reconstructed with pixels not meeting the criteria set to contrast value zero.

Figure 22:
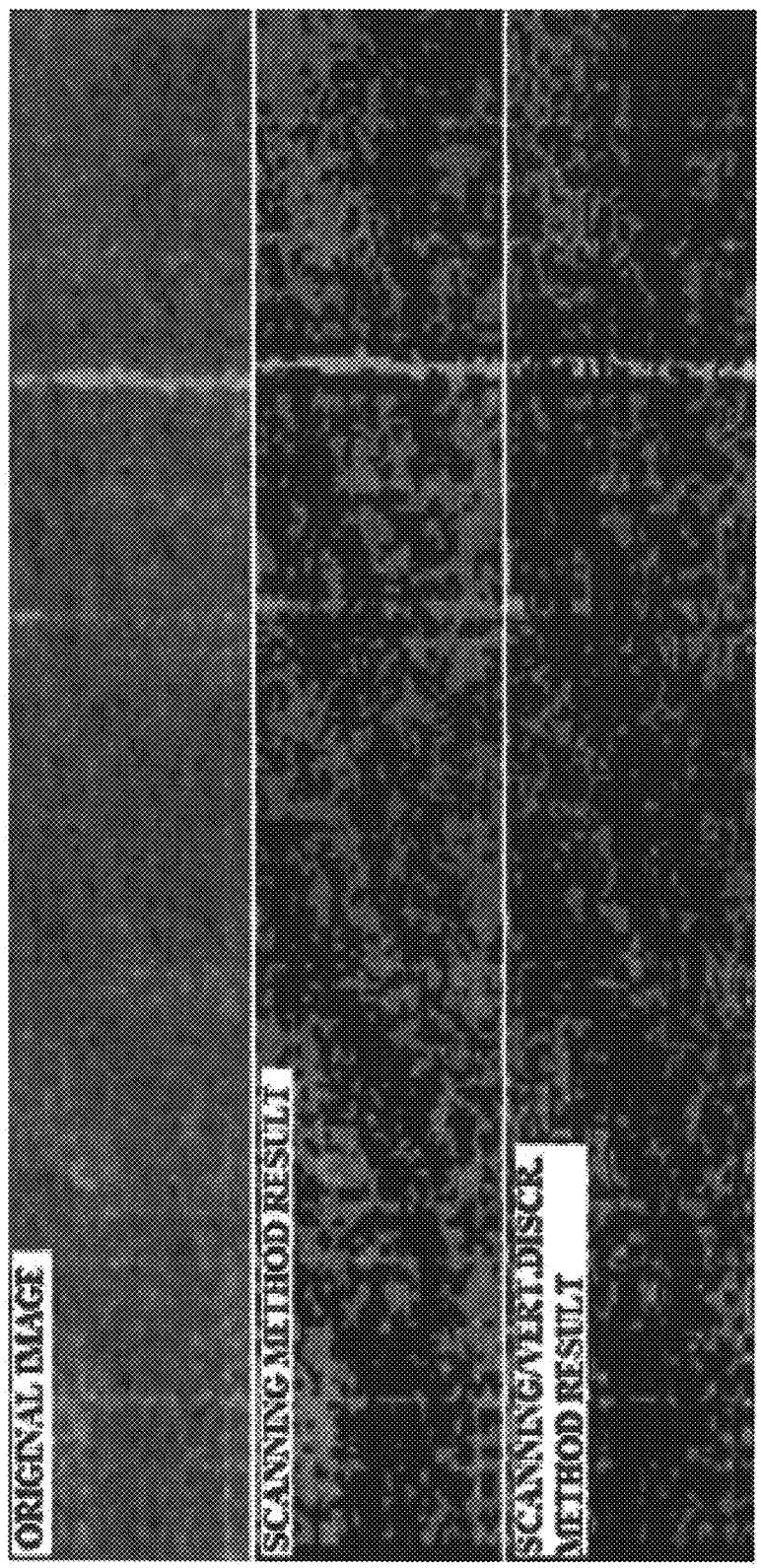
FIG. 22 is a gray scale version of FIG. 21.
Figure 23:
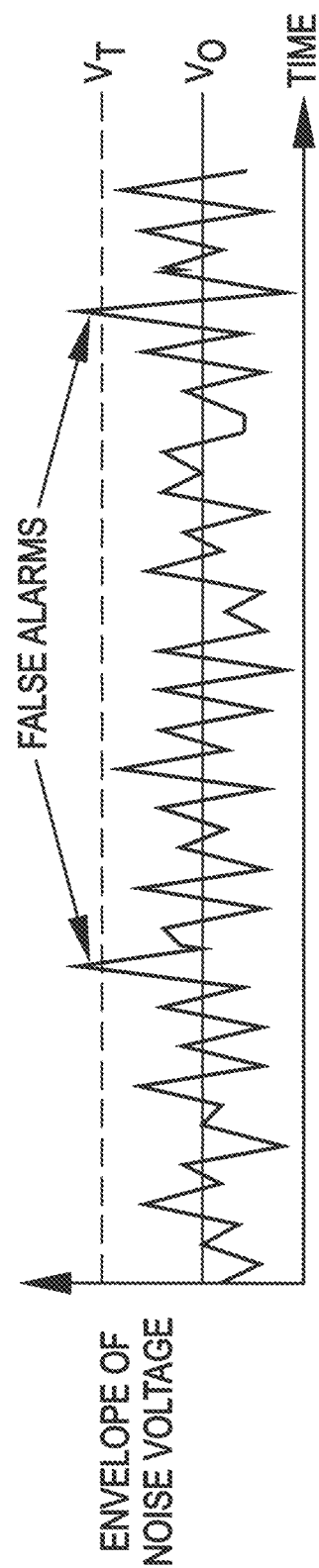
FIG. 23 is a noise threshold value of the filtered data set of FIG. 2.
Figure 24:
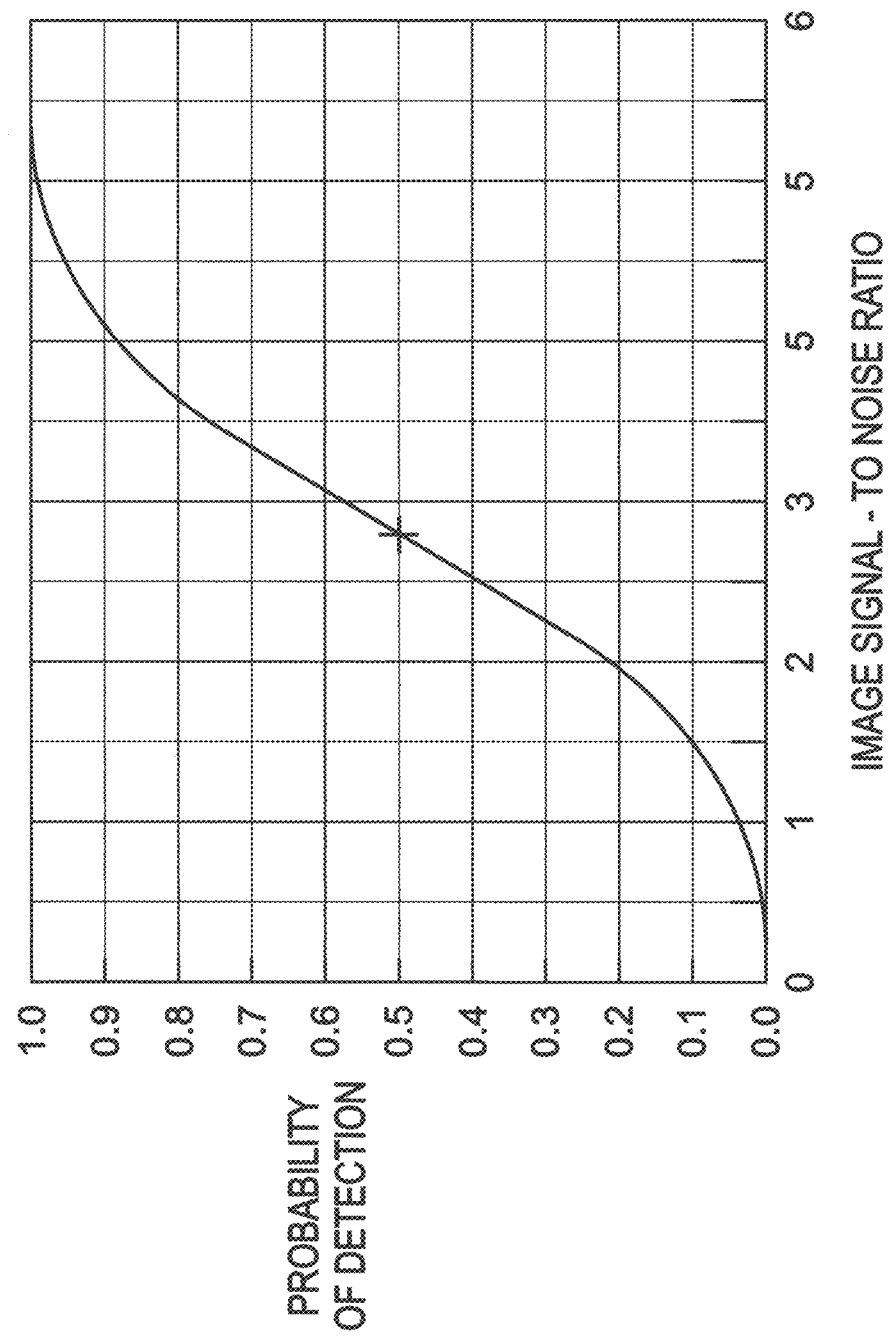
FIG. 24 is a probability chart of the filtered data of FIG. 23.

FIG. 21 and FIG. 22 show the Excel® and MATLAB® based running image results after applying both the scanning and vertical discrimination methods. In this image, a sensitivity value of four was used for the vertical discrimination method. The pixels deemed as noise in the image have been assigned a value of zero and all pixels meeting process thresholds have been preserved.

The threshold SNR method algorithm 118 is the noise reduction algorithm process involves the elimination of columns of pixels that do not contain spectral lines of interest. This method defines a noise value based on the average value of the remaining pixels. Then using the column averages as a potential signal threshold, a comparison is made between the signal and noise. If a pre-determined threshold value is met, the column pixel values will be retained and are used to build a reference matrix with value of one. If not, the entire reference matrix column is populated with a value of zero.

This method first calculates the column pixel average of the image. The second step in the process is to take all column averages greater than zero and average these values for a singular value which is representative of the image noise. It is assumed that the number of noise pixels far exceeds the number of signal pixels and approximately half of the noise has been reduced to a zero pixel value (by this stage in the process). The results can be seen in Table 5. With this approximation, a reference value for defining the noise threshold can now be determined.

TABLE 5

SNR Method Test Image Evaluation

| Column | 21 | 22 | 23 | 24 | 25 |
|---|---|---|---|---|---|
| Average SNR | 59.6 1.216 | 48.7 0.993 | 31.9 0.651 | 45.0 0.918 | 48.8 0.996 |
| Column | 26 | 27 | 28 | 29 | 30 |
| Average SNR | 54.8 1.118 | 112.3 2.291 | 37.4 0.763 | 32.3 0.659 | 30.0 0.612 |

The final quantitative step in this method involves calculating the signal-to-noise ratio. The signal-to-noise ratio is calculated by dividing the average column pixel value by the noise value determined in the previous paragraph. With this information, it is now possible to define a threshold value and begin the final process of pixel elimination in order to determine the presence of strong vertical frequency intensities.

Consider columns 21 through 30 of the Test Image in shown in Table 5. It is clear that column 27 has a significantly higher column average than surrounding columns in the image. This higher column average is indicative of a signal present in that column of data. The difficulty is determining at what value is it safe to assume a signal is present.

To make the determination as to what constitutes a line on the spectrogram, this method uses a combination of standard signal detection theory and human based psychophysical factors in human image signal detection. That is, "if a human does not recognize it as a signal through a noisy environment, then a computer can do no better" (Harney 2004).

Standard signal detection theory is grounded in the thought that if the signal can be detected, it will be above the noise threshold most of the time. Conversely, noise will be below the noise threshold most of the time. If the signal is below the noise threshold then it is not detected. If the noise is above the noise threshold then it will be a false alarm. Considering FIG. 23 (FIG. 40 of Harney 2004, 337), when the noise, $V_0$, peaks above a predefined value $V_T$, a false alarm is triggered.

In order to set the value of $V_T$ to a reasonable value that maximizes signal detection, but minimizes false alarms, the empirical study ("Performance Synthesis of Electro-Optical Sensors") conducted by Rosell and Willson was applied. In this study, it was determined that in order for a human to detect a signal through a low contrast noise environment 50% of the time, the signal-to-noise ratio has to be 2.8 dB as shown in their results in FIG. 24 (Rosell and Wilson 1974).

Figure 25:
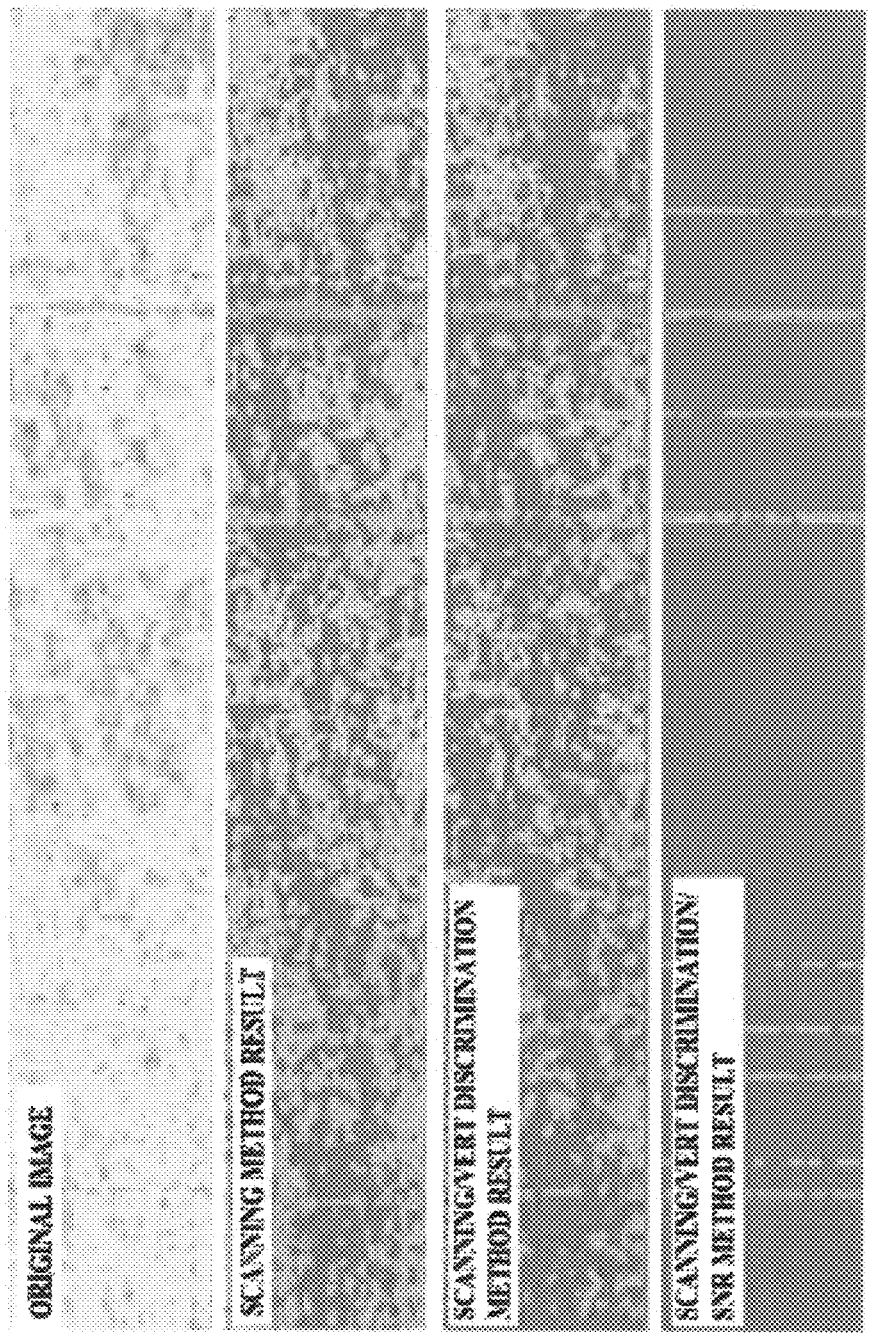
FIG. 25 is another filtered data set of the system of FIG. 2.
Figure 26:
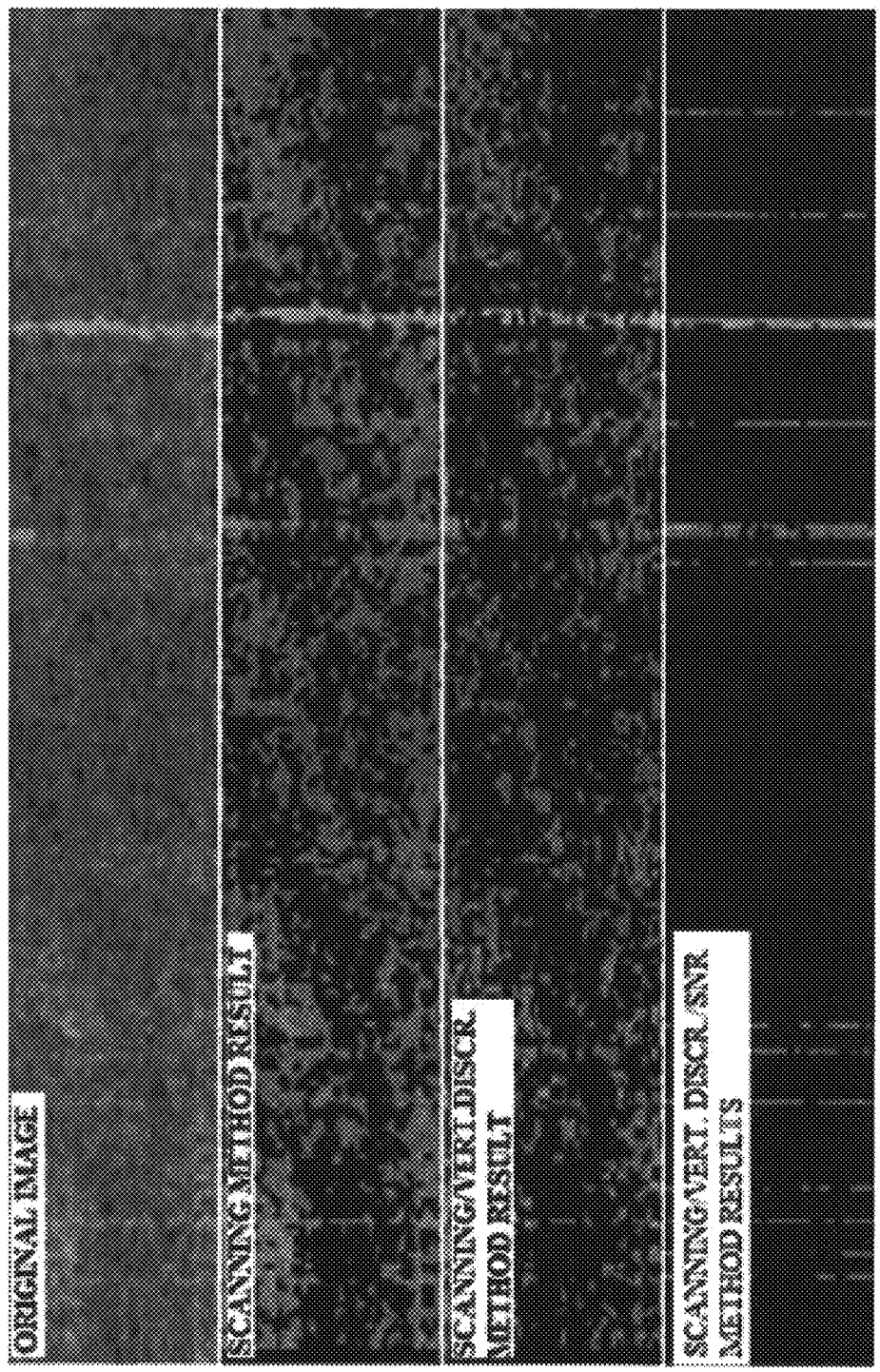
FIG. 26 is a gray scale version of FIG. 25.

Given the empirical SNR value of 2.8 dB for 50% vertical line detection determined by Rosell and Willson, the results in Table 7 can be applied for further noise reduction. Converting 2.8 dB, it is found that $SNR=10^{2.8/20}=0.72$. This calculation provides the threshold value used in the algorithm for determining which pixel values to null and which to preserve. FIG. 25 and FIG. 26 shows both the final image noise reduction Excel® and MATLAB® based results.

Figure 27:
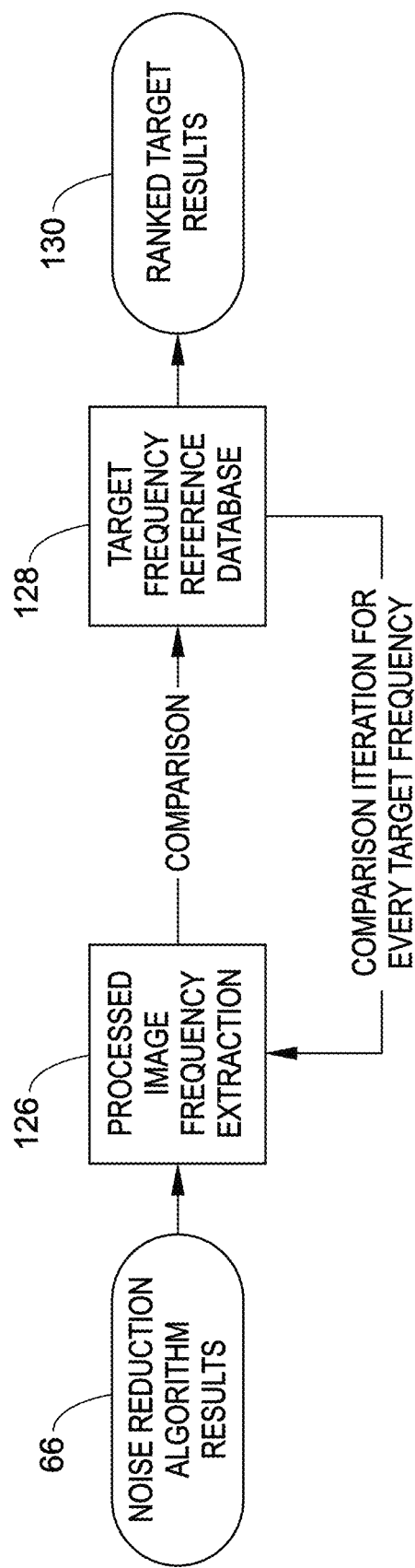
FIG. 27 is a flow chart of a noise reduction algorithm of the system of FIG. 2.

FIG. 27 illustrates the high level flow for the target identification algorithm 66. Once the time averaged images have gone through noise reduction, the result is a viable processed spectrogram that can now be used to extract useable information, as shown at 126. These processed image frequencies can now be compared against a database of accepted reference target frequencies (shown at 128) and are used to build a rank order of suspected targets (shown at 130).

Figure 28:
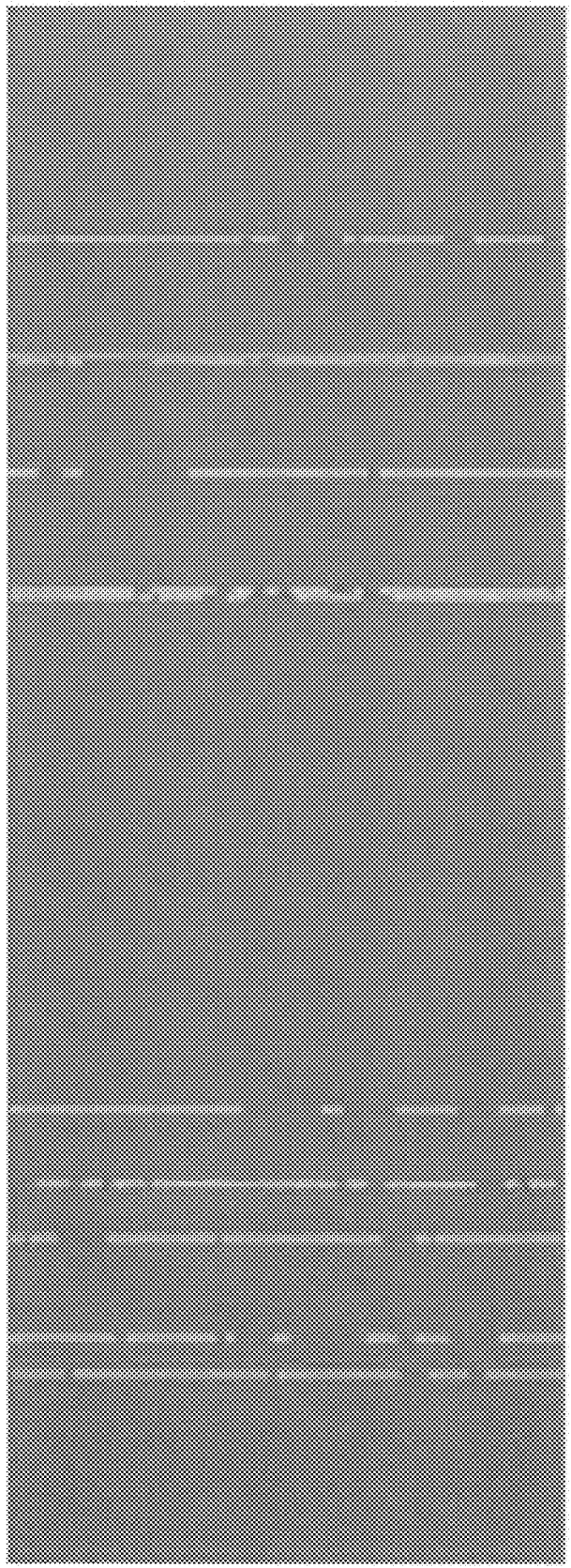
FIG. 28 is a noise-reduced filtered data set of the system of FIG. 2.

FIG. 28 shows a sample result of the noise reduction algorithm. In this image, it is observed that vertical geometry, narrowband frequency information is now available to compare against known reference targets.

Figure 29:
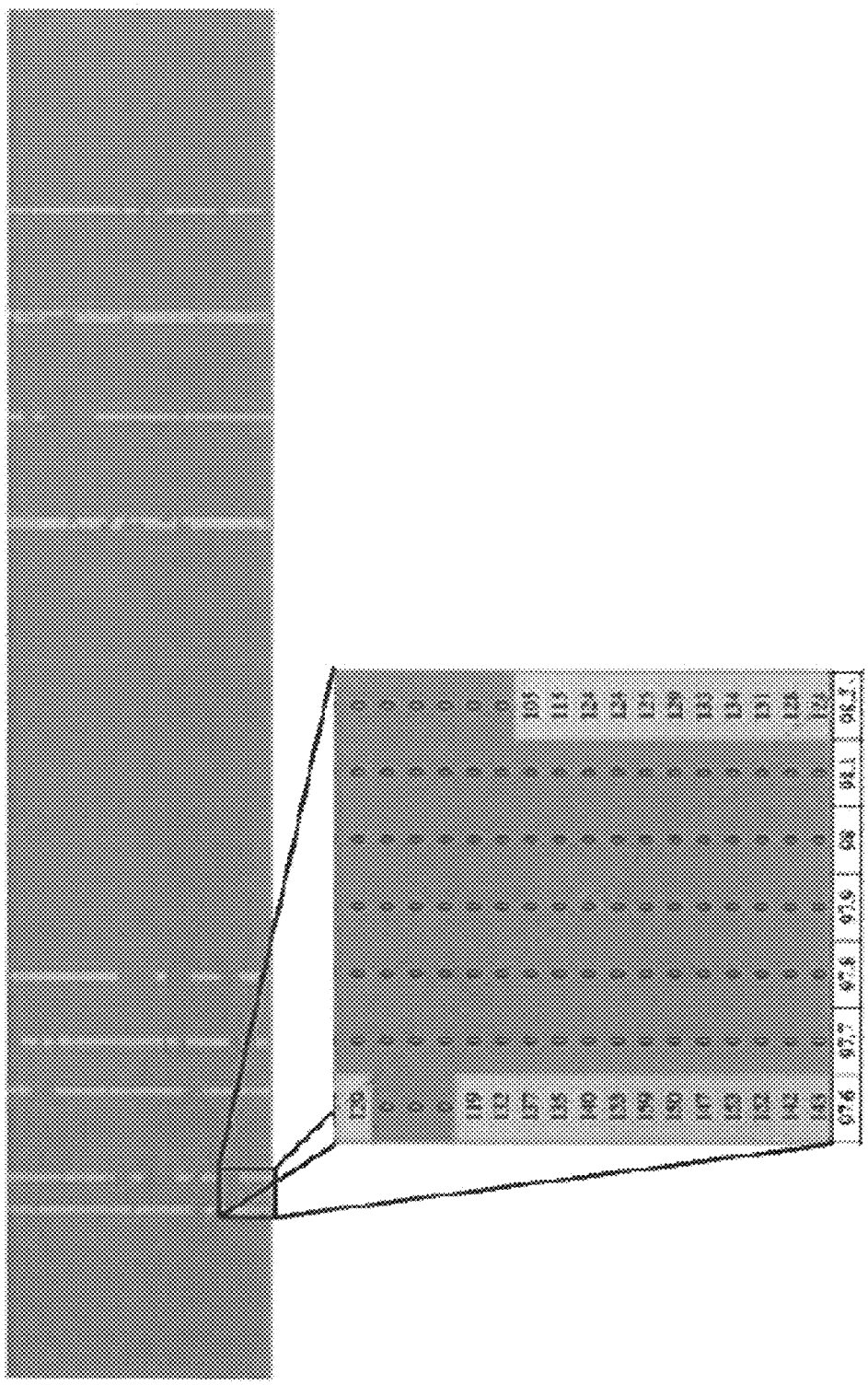
FIG. 29 is a chart showing values of the data set of FIG. 28.

FIG. 29 shows an Excel®-based proof of concept example that was used in developing the target identification algorithm. The number at the bottom of the enlarged image represents the artificial frequencies used for the comparison with the artificial reference frequencies. Two of the frequencies, in this case, identified for target comparison are 97.6 Hz and 98.2 Hz.

Table 6 displays the frequencies extracted from the processed image seen in FIG. 29. Through the noise reduction phase of the algorithm, lines of interest can now be "seen" by the computer vision algorithm for further evaluation. In this example, there are ten frequencies of interest extracted and tabulated for the next phase of the respective algorithm.

TABLE 6

Test Spectrogram Identified Frequencies

|  | FREQUENCY (Hz) |
| --- | --- |
| Frequency 1 | 97.6 |
| Frequency 2 | 98.2 |
| Frequency 3 | 99.8 |
| Frequency 4 | 100.7 |
| Frequency 5 | 110.2 |
| Frequency 6 | 110.3 |
| Frequency 7 | 112.2 |
| Frequency 8 | 114 |
| Frequency 9 | 114.1 |
| Frequency 10 | 116 |

Table 7 displays the artificial frequencies chosen for the frequency comparison portion of the algorithm. There were three targets of interest chosen for the initial iteration of software development. Frequency 1, 2, 3, are representative of commonly prosecuted frequencies of interest and associated tolerances.

TABLE 7

Accepted Reference Frequencies (Artificial)

|  | ACCEPTED FREQUENCIES (Hz) | TOLERANCE (+−Hz) |
| --- | --- | --- |
| TARGET A | | |
| Frequency 1 | 110.2 | 0.1 |
| Frequency 2 | 114.1 | 0.2 |
| Frequency 3 | 96.4 | 0.3 |
| Frequency 4 | 98.3 | 0.2 |
| Frequency 5 | 100.6 | 0.2 |
| TARGET B | | |
| Frequency 1 | 97.5 | 0.2 |
| Frequency 2 | 101.3 | 0.1 |
| Frequency 3 | 104.2 | 0.2 |
| Frequency 4 | 109.6 | 0.1 |
| Frequency 5 | 118.8 | 0.2 |
| TARGET C | | |
| Frequency 1 | 95.2 | 0.1 |
| Frequency 2 | 99.8 | 0.2 |
| Frequency 3 | 103.2 | 0.1 |
| Frequency 4 | 110.2 | 0.2 |
| Frequency 5 | 115.4 | 0.1 |

The target identification algorithm 66 now takes each frequency derived from the processed image (Table 6) and compares each of them to the range (tolerance) of every reference frequency as depicted in Table 7. This comparison will in turn yield frequencies that match the reference frequency range for all, some or none of the variables. If a frequency is matched, a numerical value of one is tabulated. If not, a numerical value of zero is assigned to the matrix seen in Table 8.

TABLE 8

Frequency Comparison and Target Evaluation Results

|  | ACCEPTED FREQUENCIES (Hz) | TOLERANCE (+−Hz) | EVALUATION | TARGET EVALUATION |
| --- | --- | --- | --- | --- |
| TARGET A | | | | |
| Frequency 1 | 110.2 | 0.1 | 1 | 0.8 |
| Frequency 2 | 114.1 | 0.2 | 1 | |
| Frequency 3 | 96.4 | 0.3 | 0 | |
| Frequency 4 | 98.3 | 0.2 | 1 | |
| Frequency 5 | 100.6 | 0.2 | 1 | |
| TARGET B | | | | |
| Frequency 1 | 97.5 | 0.2 | 1 | 0.2 |
| Frequency 2 | 101.3 | 0.1 | 0 | |
| Frequency 3 | 104.2 | 0.2 | 0 | |
| Frequency 4 | 109.6 | 0.1 | 0 | |
| Frequency 5 | 118.8 | 0.2 | 0 | |
| TARGET C | | | | |
| Frequency 1 | 95.2 | 0.1 | 0 | 0.4 |
| Frequency 2 | 99.8 | 0.2 | 1 | |
| Frequency 3 | 103.2 | 0.1 | 0 | |
| Frequency 4 | 110.2 | 0.2 | 1 | |
| Frequency 5 | 115.4 | 0.1 | 0 | |

After all processed image frequencies have been evaluated, the total number of matched frequencies are divided by the total number of frequencies evaluated (Table 8). This process is done for all the targets and a numerical rank order is built as seen in Table 9, which provides the user an idea of the targets most likely found in the time averaged spectrogram.

TABLE 9

Target Identification Rank Order Results

| TARGET A | 1 |
| --- | --- |
| TARGET B | 3 |
| TARGET C | 2 |

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to a system for performing the operations discussed herein. This system may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other system. Various general-purpose systems may be used with programs in accordance with the teachings herein, or it may prove convenient to construct more specialized system to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of identifying a target, the method comprising:
   receiving an acoustic spectrogram video associated with the target;
   calculating at least one acoustic parameter from the acoustic spectrogram video;
   determining a time averaging factor for the acoustic spectrogram video;
   scaling the acoustic spectrogram video with the time averaging factor to produce an averaged spectrogram image;
   applying a noise reduction algorithm to the at least one acoustic parameter, comprising:
      filtering the averaged spectrogram image; and
      producing a noise reduced spectrogram image associated with the target from the filtered spectrogram image;
   applying a target identification algorithm to the at least one acoustic data parameter, comprising:
      extracting and storing at least one processed image frequencies of interest from the noise reduced spectrogram image;
      accessing a reference electronic database to find at least one standardized target frequency and at least one standardized frequency tolerance;
      matching a processed image frequency of interest of a target image as being within a standardized frequency tolerance of a standardized target frequency, wherein pixel values for the target image are determined based on a comparison of the processed image frequency and the standardized frequency tolerance; and
      building a target identification that comprises the target image and the pixel values, wherein each of the pixel values reflects an intensity of a feature in the corresponding pixel; and
   displaying the target identification of the target.

2. The method of claim 1, wherein building the target identification further comprises:
   comparing the image and target frequencies of interest;
   comparing the image and target frequencies tolerances; and
   determining a plurality of proposed target identifications based on the comparisons of the frequencies of interest and the frequencies tolerances.

3. The method of claim 2, further comprising:
   sorting at least one calculated acoustic parameter and at least one associated harmonic associated with the target;
   ranking the plurality of proposed target identifications according to the sorted parameter and harmonic to determine at least one most probable target identification; and
   displaying the at least one most probable target identification.

4. A system for identifying a target, the system comprising:
an acoustic parameter database configured to receive an acoustic spectrogram video associated with the target;
a calculation algorithm programmed to calculate at least one acoustic parameter from the acoustic spectrogram video;
an auto-analysis algorithm programmed to:
apply a target identification algorithm to the at least one acoustic data parameter; and
determine a time averaging factor for the acoustic spectrogram video; and
scale the acoustic spectrogram video with the time averaging factor to produce an averaged spectrogram image;
apply a noise reduction algorithm to the at least one acoustic parameter, comprising:
filtering the averaged spectrogram image;
producing a noise reduced spectrogram image associated with the target from the filtered spectrogram image;
apply a target identification algorithm to the at least one acoustic data parameter, comprising:
extracting and storing at least one processed image frequencies of interest from the noise reduced spectrogram image;
accessing a reference electronic database to find at least one standardized target frequency and at least one standardized frequency tolerance;
matching a processed image frequency of interest of a target image as being within a standardized frequency tolerance of a standardized target frequency, wherein pixel threshold values for the target image are determined based on a comparison of the processed image frequency and the standardized frequency tolerance; and
building a target identification that comprises the target image and the pixel values, wherein each of the pixel values reflects an intensity of a feature in the corresponding pixel; and
a graphical user interface configured to display the target identification of the target.

5. The system of claim 4, wherein the auto-analysis algorithm is programmed to build the target identification by:
comparing the image and target frequencies of interest;
comparing the image and target frequencies tolerances; and
determining a plurality of proposed target identifications based on the comparisons of the frequencies of interest and the frequencies tolerances.

6. The system of claim 5, wherein the auto-analysis algorithm is programmed to:
sort at least one calculated acoustic parameter and at least one associated harmonic associated with the target;
rank the plurality of proposed target identifications according to the sorted parameter and harmonic to determine at least one most probable target identification; and
transmit the at least one most probable target identification to the graphical user interface.

7. A system for identifying a target, the system comprising:
an acoustic parameter database configured to receive an acoustic spectrogram video associated with the target;
a calculation algorithm programmed to calculate at least one acoustic parameter from the acoustic spectrogram video;
an auto-analysis algorithm programmed to:
determine a time averaging factor for the video;
scale the acoustic spectrogram video with the time averaging factor to produce an averaged spectrogram image;
filter the averaged spectrogram image;
produce a noise reduced spectrogram image associated with the target from the filtered spectrogram image; and
apply a target identification algorithm to the at least one acoustic data parameter, comprising:
extracting and storing at least one processed image frequencies of interest from the noise reduced spectrogram image;
accessing a reference electronic database to find at least one standardized target frequency and at least one standardized frequency tolerance;
matching a processed image frequency of interest of a target image as being within a standardized frequency tolerance of a standardized target frequency, wherein pixel threshold values for the target image are determined based on a comparison of the processed image frequency and the standardized frequency tolerance; and
building a target identification that comprises the target image and the pixel values, wherein each of the pixel values reflects an intensity of a feature in the corresponding pixel; and
a graphical user interface configured to display the target identification of the target.

8. The system of claim 7, wherein the auto-analysis algorithm is further programmed to:
build at least one target identification by:
comparing the image and target frequencies of interest;
comparing the image and target frequencies tolerances; and
determining a plurality of proposed target identifications based on the comparisons of the frequencies of interest and the frequencies tolerances,
and further wherein the auto-analysis algorithm is programmed to:
sort at least one calculated acoustic parameter and at least one associated harmonic associated with the target;
rank the at least one proposed target identifications according to the sorted parameter and harmonic to determine at least one most probable target identification; and
transmit the at least one most probable target identification to the graphical user interface.

* * * * *